(12) United States Patent
Kazarian

(10) Patent No.: US 12,544,188 B2
(45) Date of Patent: Feb. 10, 2026

(54) METHOD FOR CONSTRUCTING AND DISPLAYING 3D COMPUTER MODELS OF THE TEMPOROMANDIBULAR JOINTS

(71) Applicants: Arsen Ovsepovich Kazarian, Moscow (RU); Michael Arakelyan, Palm Beach Gardens, FL (US)

(72) Inventor: Arsen Ovsepovich Kazarian, Moscow (RU)

(73) Assignees: Arsen Kazarian, Moscow (RU); Michael Arakelyan, Palm Beach Gardens, FL (US)

( * ) Notice: Subject to any disclaimer, the term of this patent is extended or adjusted under 35 U.S.C. 154(b) by 356 days.

(21) Appl. No.: 18/009,768

(22) PCT Filed: Jan. 22, 2021

(86) PCT No.: PCT/RU2021/050015
§ 371 (c)(1),
(2) Date: Dec. 12, 2022

(87) PCT Pub. No.: WO2021/251848
PCT Pub. Date: Dec. 16, 2021

(65) Prior Publication Data
US 2023/0240800 A1 Aug. 3, 2023

(30) Foreign Application Priority Data
Jun. 10, 2020 (RU) .................. RU2020119178

(51) Int. Cl.
*A61C 7/00* (2006.01)
*A61C 9/00* (2006.01)
*A61C 19/045* (2006.01)

(52) U.S. Cl.
CPC ............ *A61C 7/002* (2013.01); *A61C 19/045* (2013.01); *A61C 9/0053* (2013.01)

(58) Field of Classification Search
CPC ..... A61C 7/002; A61C 19/045; A61C 9/0053; A61C 9/004; A61C 11/00; A61B 6/03; G16H 20/00
See application file for complete search history.

(56) References Cited

U.S. PATENT DOCUMENTS

| 11,576,631 | B1* | 2/2023 | Rubio ................. A61B 6/5294 |
| 2007/0207437 | A1 | 9/2007 | Sachdeva et al. |

(Continued)

FOREIGN PATENT DOCUMENTS

| RU | 2 608 704 C1 | 1/2017 |
| RU | 2 679 557 C1 | 2/2019 |
| RU | 2 711 974 C1 | 1/2020 |

OTHER PUBLICATIONS

International Search Report in PCT/RU2021/050015, mailed May 13, 2021.

*Primary Examiner* — Iriana Cruz
(74) *Attorney, Agent, or Firm* — Collard & Roe, P.C.

(57) ABSTRACT

In CT visualization software, zones of the right and left temporomandibular joints (TMJs) are visualized sequentially. In a frontal plane, each of the condylar processes of the TMJs are delimited into sections. In a sagittal plane, separate 3D contours of the fossae and the condyles of the TMJs are created. The contours of the condyles are combined with a 3D model of the mandibular teeth, and a 3D model of the mandible with the teeth and the condylar processes is obtained. The contours of the fossae are combined with a 3D model of the maxillary teeth, and a 3D model of the maxilla with the teeth and the contours of the glenoid fossae is obtained. The 3D scene objects obtained are distributed according to side and identification code, and precise tracking of the movement of the condyles and the fossae of the TMJs during movement of the mandible is provided.

4 Claims, 18 Drawing Sheets

(56) References Cited

U.S. PATENT DOCUMENTS

| | | | |
|---|---|---|---|
| 2013/0204600 A1* | 8/2013 | Mehra | G16H 50/50 |
| | | | 703/11 |
| 2020/0129296 A1* | 4/2020 | Chary | A61F 2/30 |
| 2020/0138518 A1* | 5/2020 | Lang | A61B 17/1666 |
| 2020/0268495 A1* | 8/2020 | Ryakhovsky | A61C 13/34 |
| 2020/0275995 A1* | 9/2020 | Bühler | A61C 7/002 |
| 2020/0383752 A1* | 12/2020 | Willers | A61C 11/00 |
| 2022/0008174 A1* | 1/2022 | Jaisson | A61C 7/002 |
| 2022/0233285 A1* | 7/2022 | Richter | A61C 9/0053 |
| 2022/0246270 A1* | 8/2022 | Alvarez | A61C 9/004 |

* cited by examiner

METHOD FOR CONSTRUCTING AND DISPLAYING 3D COMPUTER MODELS OF THE TEMPOROMANDIBULAR JOINTS

CROSS REFERENCE TO RELATED APPLICATIONS

This application is the National Stage of PCT/RU2021/050015 filed on Jan. 22, 2021, which claims priority under 35 U.S.C. § 119 of Russian Application No. 2020119178 filed on Jun. 10, 2020, the disclosure of which is incorporated by reference. The international application under PCT article 21(2) was not published in English.

Invention is related to medicine, dentistry in particular.

Can be applied to prosthodontic, orthodontic, surgical treatment, diagnostic and treatment of temporo-mandibular joints (further referred as TMJ).

During the planning of complex dental treatment, special attention is paid to the position of mandibular condyles in articular fossas. Control of position of condyles is achieved through interpretation of data from computer tomography (CT) and magnetic resonance tomography (MRT). Important stage in modern diagnostics is the construction of 3 dimensional structures of anatomical structures based on data from CT. Having separately segmented 3 dimensional objects of structures of temporo-mandibular joint (TMJ) allows the possibility to analyze its morphology and to predict its movement in space. There are methods of recording of movements of TMJ and assignment of recorded trajectories to separately segmented fragments of TMJ, which allows viewing the movements of mandible in space on a computer screen and respectively track the movements of condyles in articular fossas.

With the advent of digital technologies in dental field-computer tomography, CAD-CAM systems of prototyping, much more attention is paid to the precision of manufacturing structures, and respectively demands special requirements to diagnosis and control of changes of all oral-facial structures, including TMJ.

When dental implants and suprastructures are milled, precision of 5-8 microns is achieved. During fabrication of a permanent restoration (crowns, inlay/onlay, splints etc) milling or 3D printing, precision ranges from 8-100 microns, depending on system type. Clinical analysis of occlusal relationships of teeth and their articulation (chewing function) is determined within the limits of 8-10 microns. Known fact is the correlation of position and forms of dental arches with positions and forms of TMJ.

There is also scientific data, confirming that even extremely minor displacement and changes in TMJ affect the entire dento-alveolar complex and the central nervous system in general. For detailed up to date study of correlation between TMJ, nervous system, function, para-function, structure of dentition and dento-alveolar system-new approach to study the structures of TMJ is required. There is a need to study all structures of TMJ with maximum possible control of precision and displaying acquired data in 3 dimensional mode.

Bony structures of TMJ are interpreted and diagnosed by the doctor with the aid of a computer tomography. There is an official manual by Sirona, SICAT Function, https://yadi.sk/i/C4SYPIRjq3io3A where precision values are indicated while CT data is analyzed using SICAT. (Table 1)

| Precision In the next table the values of precision in all SICAT applications are represented. | |
|---|---|
| Precision measurement for distance | <100 μm |
| Precision measurement for angle | <1 deg |
| Precision of image | <20 μm |
| Precision of image for data for jaw's movement | <0.6 mm |

However, existing methods of automated segmentation of CT images and obtainment of 3D models of lower jaw as an isolated 3 dimensional structure have disadvantage-significant imprecision of obtained 3D models, in the area of condyles and articular fossas. This is due to known methods of auto segmentation used to construct isolated 3D objects, based on the analysis of brightness of image points of tomography, wherein they are unable to precisely recognize an object with borderline value. The data which was available and understandable to the doctor and was interpreted as joint space, condylar margin on a particular slice, are not caught by auto segmentation systems; precision of contouring of objects leads to pretty significant distortion of 1 mm or more. The presence of cartilage outside, as well as inside of a joint is interpreted as bone, or its absence, which leads to a significantly distorted perception of the volume concept and inaccuracies constructing the 3D layout of TMJ. Algorithms of manually painting objects on each individual layer of CT in three projections will take hours of working time and are irrational in a clinical setting.

In known methods of computer reproduction-recordings of movements of lower jaw, where movements of condyles in space are monitored and mathematically on programming level, evaluates movement of not the precise detailed contours of condyles in relation to articular fossa, but its distorted models, which significantly reduces scientific and clinical significance of known methods.

Available software interface does not provide a convenient, detailed display of structures of TMJ, which are represented in 3D objects, obtained using the method of auto segmentation of CT, which does not allow the doctor to precisely analyze changes and movements of objects in space.

There are known solutions to create isolated 3D models from patients' computer tomography scan.

3D Slicer—https://www.slicer.org/.Segmentation manual: https://www.slicer.org/wiki/Documentation/4.6%23Module_by_category_Segmentation;

https://yadi.sk/i/-Si8U-1KqtAPaQ (Tutorial: Preparing Data for 3D Printing Using 3D Slicer).

However, on the basis of a data of instructions and technological solutions, it is possible to obtain only approximate, very imprecise models of the condyles and articular fossas. When working with different quality of CT, different morphology of joints, this problem always arises. When working with any softwares of auto segmentation, objects of TMJ get very provisional topography with significant excess or diminution of volume.

There is a known way of manual, layered painting of the object of interest https://yadi.sk/i/cvPzELIn9-atUg (3D Slicer Tutorial: How to Segment a Lumbar Vertebrae).

However, time spent for this process makes it difficult to utilize it in everyday dentist practice.

The prototype is an auto slicing method for obtaining isolated 3d objects of TMJ from patients CT scan by Sirona SICAT FUNCTION:
https://www.sicat.com/products/functional-dentistry/:
https://yadi.sk/i/C4SYPIRjq3io3A (segmentation page. 105);
https://yadi.sk/i/2O6bCtc5hA3d4w (official video on auto segmentation).

The method is based on commonly known principles of CT auto segmentation, allowing provisionally to isolate more bright and contrast objects.

However, in this software solution the same widespread inaccuracy arises while constructing condyles and fossae of TMJ as isolated 3D objects. When changing the threshold of auto segmentation, TMJ objects are obtained either with excess or with insufficient volume. To separate condyle-fossa areas of connection in a software, scissor tool is utilized, which very provisionally separates segmentation map and final 3D objects, condyles and TMJ fossae do not bear precise form.

Method of constructing of 3D objects, condyles and articular fossas, using auto segmentation, bears serious losses in precision, quantifiable in mm (millimeters), which does not allow to utilize the inherent technological potential of precision of CT studies, claimed in official documentation 20-100 microns (table 1).

In conducting the diagnostics and therefore treating the patients, such procedures as determining centric relation and mandible treatment position, and fabricating different kinds of restorations are performed with very conditional precision and as a result-bear very conditional clinical significance. Increasing precision of diagnostics of position and movements of condyles in TMJ from margin of error of 1 mm to 100 microns, clinical significance of performed procedures greatly increases.

BRIEF SUMMARY OF THE INVENTION

Technical result of invention is an increase of precision of diagnostics and control of position and movements of condyles in joints, constructing 3D models of TMJ with precision of up to 100 microns, control of their movement in space, determining more precise treatment position of lower jaw for further fabrication of different kinds of treatment restorations, for example: crowns, inlays, onlays, prosthesis, splints and functional orthodontic appliances.

Declared technical result is achieved by, just like in the known method, computer tomography study is conducted, dental arches of upper and lower jaws are scanned with intraoral 3D scanner and acquire 3D objects of jaws in existing bite, obtained CT study is aligned in 3D space relative to Frankfurt or Camper horizontal or relative to other anatomical reference points and into multiplanar reconstruction of CT, 3D models of upper and lower jaws are integrated (FIG. 1 A,B,C,D).

Uniqueness of claimed method is that in software to view the CT studies the right and left TMJ regions are consequentially visualized in sagittal, coronal and axial projections of a multi-planar reconstruction and isolated 3D objects of condylar contours and contours of articular fossas are created, external margin of a right condyle is visualized, contours of condyle and articular fossa of TMJ are encircled and 3D objects of contour of condyle RC1 and contour of fossa RF1 are obtained. Then, the internal margin of a condyle is visualized and in sagittal projection contour of condyle and fossa are marked out to obtain 3D objects of contours of condyle RC9 and fossa RF9, in frontal projection the distance between obtained contours RC1 and RC9 is measured and divided in half and the midpoint of the condyle is discovered and visualized, in visualized zone of midpoint of condyle, in sagittal projection contours of condyle and fossa of TMJ are encircled and 3D objects of contours of condyle RC5 and fossa RF5 are obtained, then in frontal projection the distance measured between contours RC1-RC5 is divided at midpoint and discover position of next slice of MPR (multiplanar reconstruction) of CT study, in sagittal projection, contours of condyle and TMJ fossa are marked and 3D objects of contours of condyle and fossa RC3 and RF3 are obtained, in frontal projection the distance measured between contours RC5-RC9 is divided at midpoint and discover the position of next slice of MPR (multi-planar reconstruction) of CT study, in sagittal projection contours of condyle and fossa of TMJ are encircled and 3D objects of contour of condyle RC7 and fossa RF7 are obtained, then, using above described method midpoints of distances are found between obtained neighboring contours and in sagittal projection contours of condyle and fossa are encircled and 3D objects of contours of condyle RC2, RC4, RC6, RC8 are obtained and 3D objects of contours of fossa RF2, RF4, RF6, RF8 are obtained, 9 contours of condyles and 9 contours of fossa are obtained in sagittal projection, respectively 9 3D contours of condyle and 9 3D contours of fossa of TMJ, further, the top point of TMJ fossa is visualized in CT study, contour of fossa is marked in frontal projection and 3D object of contour of TMJ fossa—KR1+ is obtained, then, shifting 3 mm to the front from contour KR1+, and contour of TMJ fossa is marked in frontal projection and 3D object of contour of TMJ fossa—KR2+ is obtained, from contour KR1+ shifting 3 mm back and distally encircling contour of fossa and 3D object of contour KR3+ is obtained, then for left TMJ all actions described above for right TMJ are repeated and 3D contour model of left TMJ is obtained with respected 3D models of contours and its designations: LC1, LC2, LC3, LC4, LC5, LC6, LC7, LC8, LC9 for contours of left condyle and LF1, LF2, LF3, LF4, LF5, LF6, LF7, LF8, LF9 for contours or left TMJ fossa. KL1+, KL2+, KL3+ 3D objects: contours of right and left condyles are merged with 3D model of mandible dental arch, which was previously integrated into multiplanar reconstruction of CT study and complete 3D model of mandible with dental arch and condyles is obtained. 3D objects of contours of right and left TMJ fossa's are merged with 3D model of upper jaw with dental arch, which was previously integrated into multi-planar reconstruction of CT and complete 3D model of maxilla with dental arch and contours of TMJ fossa's is obtained-"immovable part of the skull". Next, objects of 3D scene obtained are allocated into 6 zones in window interface, where amount of cells equals to amount of contours obtained in sagittal and frontal projections according to the sides and designations legend and precise track of movements of condyle in TMJ fossa during lower jaw movement is obtained.

Invention is illustrated with detailed description, clinical example and illustrations which display:

SUMMARY OF DRAWINGS

FIG. 1—3D models of upper and lower jaw: A) 3D models of jaws are integrated in CT's virtual reconstruction; B) The view of contours of models in axial projection of CT; C) The view of contours of models in frontal projection of CT; D) The view of contours of models in sagittal projections of CT.

FIG. 2—3D objects of contours of condyle RC1 and fossa RF1: A) contours of condyle RC1 and fossa RF1 in 3D scene; B) the view of contours RC1 and RF1 in axial projection of CT; C) the view of contours RC1 and RF 1 in frontal projection of CT; D) the view of contours RC1 and RF1 in sagittal projection of CT.

FIG. 3—3D objects of contours of condyle RC9 and fossa RF9: A) 3D scene, contours of condyle and fossa RC9 and RF9; B) the view of contours RC9 and RF9 in axial projection of CT; C) the view of contours RC9 and RF9 in frontal projection of CT; D) the view of contours RC9 and RF9 in sagittal projection of CT.

FIG. 5—3D objects of contours of condyle RC5 and fossa RF5: A) 3D scene, obtained contours of fossa RF5 and condyle RC5; B) axial projection; C) frontal projection; D) sagittal projection.

FIG. 6—3D objects of contours of condyle RC3 and fossa RF3: A) 3D scene with previously obtained contours and contours RC3, RF3; B) axial projection; C) frontal projection; D) sagittal projection.

FIG. 7—3D objects of contours of condyle RC7 and fossa RF7: A) 3D scene with previously obtained contours and contours RC7, RF7; B) axial projection; C) frontal projection; D) sagittal projection.

FIG. 8—3D objects of contours of condyle RC2 and fossa RF2: A) 3D scene with previously obtained contours and contours RC2, RF2; B) axial projection; C) frontal projection; D) sagittal projection.

FIG. 15—3D scene with precise models of upper and lower jaw. Dental arches, condyles and TMJ fossa's: A) 3D scene with combined models, dental arches, condyles and TMJ fossa's; B) top view; C) left view; D) frontal view.

FIG. 16—3D objects allocation zones in window interface: A) contours of right TMJ mapping zone obtained in sagittal projection; B) contours of left TMJ mapping zone obtained in sagittal projection; C) contours of right TMJ mapping zone obtained in frontal projection; D) contours of left TMJ mapping zone obtained in frontal projection; E) mapping zone of combined models of jaws and models of joints; F) mapping zone only for 3D models of TMJ, right and left respectively.

FIG. 17—3D objects of contours of TMJ allocated in window interface: A) mapping zone of contours of right TMJ obtained in sagittal projection; B) mapping zone of contours of left TMJ obtained in sagittal projection; C) mapping zone of contours of right TMJ obtained in frontal projection; D) mapping zone of contours of left TMJ obtained in frontal projection; E) mapping zone of combined 3D scene with models of jaws and joints; F) mapping zone only for 3D models of TMJ, right and left respectively.

FIG. 21—3D models of jaws obtained with intra-oral scanning, side view: A) models in existing occlusion of the patient (CO); B) models with mandible protrusion (PRO); C) models of jaws with open mouth (OP)

FIG. 22—3D models obtained with intra-oral scanning, front view:
A) models with mandible right shift—right laterotrusion (LR); B) models with mandible left shift—left laterotrusion (LL).

FIG. 23—3D scene with combined models of jaws and 3D contour models of TMJ: A) models in the patient's existing occlusion (CO); B) models in open position (OP); C) models with protrusion shift (PRO).

FIG. 24—3D scene with combined models of jaws and 3D contour models of TMJ with mandible side shifts: A) models with left mandible shift—left laterotrusion (LL); B) models with right mandible shift—right laterotrusion (RL).

FIG. 25—3D objects demonstration, allocated in window interface; position of habitual occlusion and position with protrusion (PRO): A) mapping zone of contours of right TMJ, obtained in sagittal projection; B) mapping zone of contours of left TMJ obtained in sagittal projection; C) mapping zone of contours of of right TMJ obtained in frontal projection; D) mapping zone of contours of left TMJ obtained in frontal projection; E) mapping zone of combined 3D scene with models of jaws and models of joints; F) mapping zone only for 3D models of TMJ, right and left respectively.

FIG. 30—3D models of fossa and condyle in the level of contours RC4-RF4, right TMJ, movement of condyle into treatment position.

DESCRIPTION OF EMBODIMENTS.
EXAMPLES

The method is conducted as follows:

In software, to view CT studies data (Radiant Dicom Viewer https://www.radiantviewer.com), right and left TMJ zones are consequentially visualized in sagittal, coronal and axial projections of multiplanar CT reconstruction and 3D contours of condyles and contours of articular fossas are created by the means of software tool, for example, Bezier curve, or by method of placing points with its further interpolation and contour creation. Objects are contoured (with computer mouse or sensor pen on stationary computers or tablets).

Obtaining precise contours of the TMJ is implemented as follows (example of the right TMJ).

Figure 2:
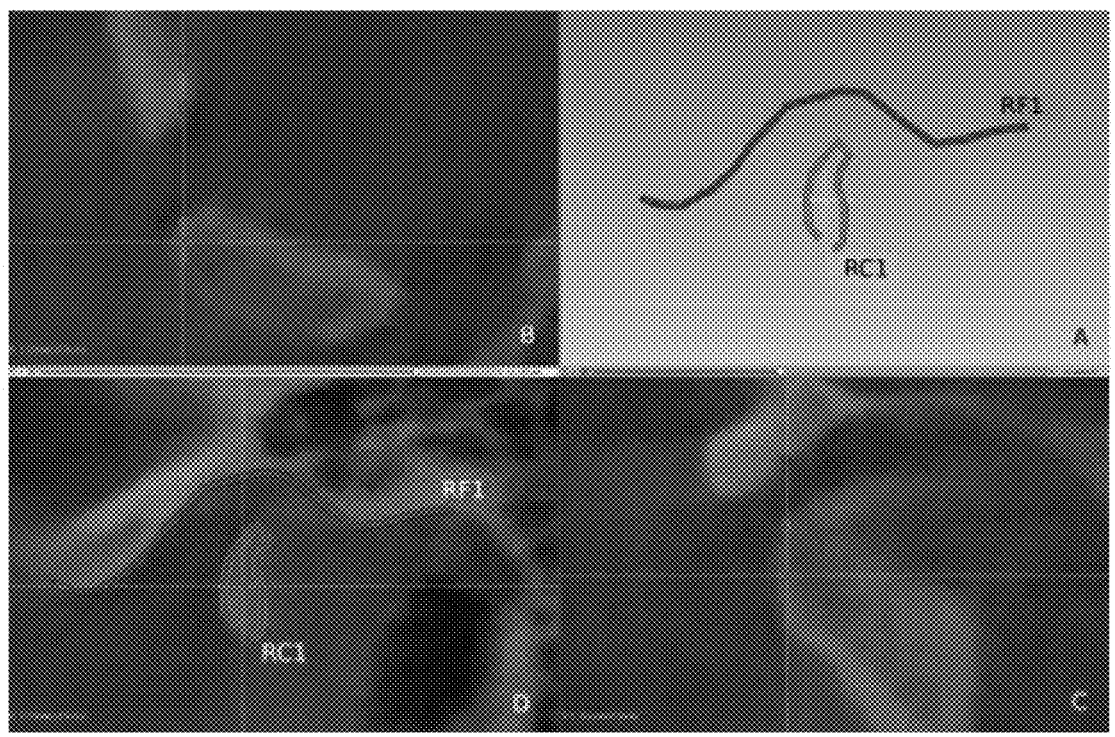

In a multi-planar reconstruction of CT assessment, the outer margin of right condyle is visualized and contour of condyle is encircled as well as contour of fossa in sagittal projection. 3D objects of contours of condyle RC1 and fossa RF1 are obtained (FIG. 2A, B, C, D). Inner margin of right condyle is visualized in a multiplanar reconstruction of CT assessment and contour of condyle and fossa is encircled in sagittal projection. 3D objects of contours of condyle RC9 and fossa RF9 are obtained (FIG. 2A, B, C, D).

With orientation to frontal projection, the distance between obtained contours RC1 and RC9 is measured and divided in half, which leads to a discovery of middle point of condyle and in this spectrum of CT assessment the middle zone of condyle is visualized (FIG. 4A, B, C, D).

Figure 5:
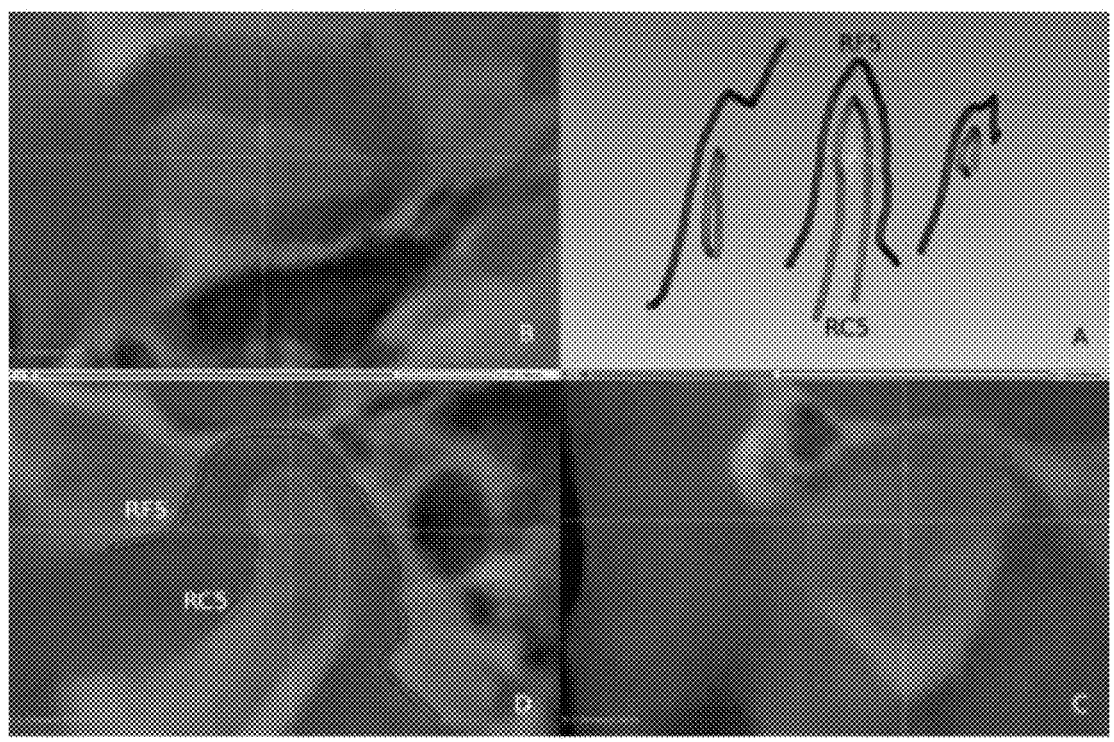
Figure 6:
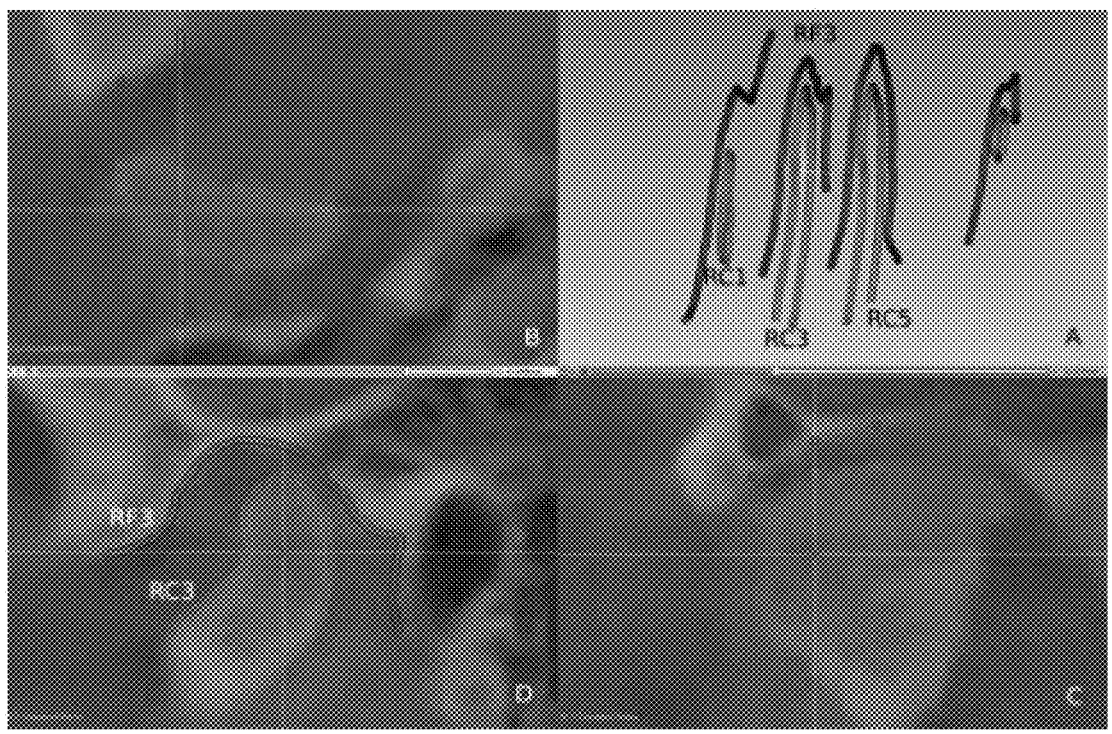

In the visualized zone of the middle of a condyle in CT assessment, in sagittal projection contours of condyle and TMJ fossa are encircled. 3D objects of contours of condyle RC5 and fossa RF5 are obtained (FIG. 5 A, B, C, D). Distance between contours RC1-RC5 is measured and divided in half to find the position of a next slice of CT assessment. Contours of condyle RC3 and TMJ fossa RF3 are created in sagittal projection (FIG. 6 A, B, C, D).

Figure 7:
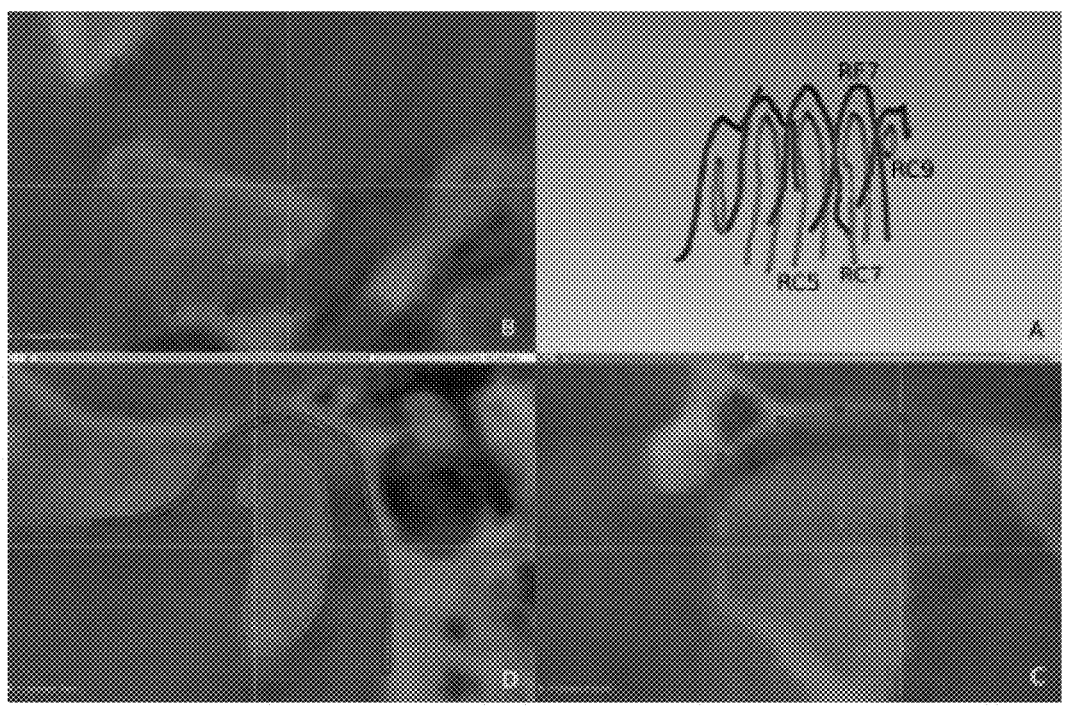

The distance between contours RC5-RC9 is measured and divided in half to find the position of a next slice of CT, contours of condyle RC7 and TMJ fossa RF7 are created in sagittal projection (FIG. 7 A, B, C, D).

Figure 8:
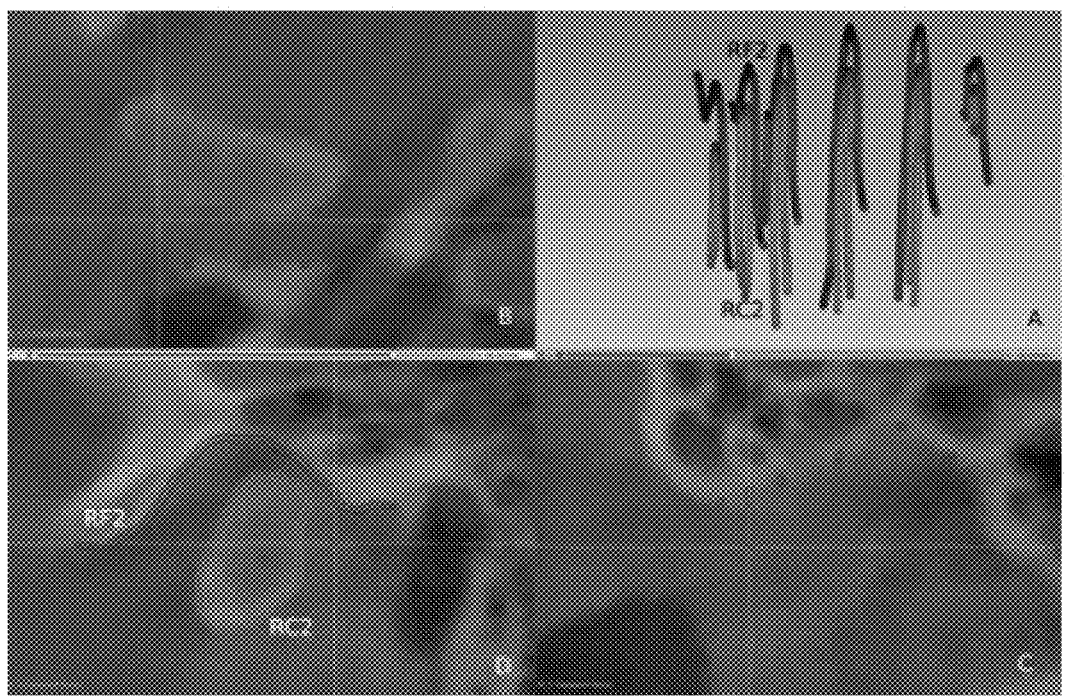

Then, using the above described method, midpoint is found between obtained neighboring contours, RC1-RC3, and position of a next slice of CT assessment is found, contours of condyle and TMJ fossa RC2-RF2 are created in sagittal projection (FIG. 8 A, B, C, D). Further, by finding the midpoint of distances between contours RC3-RC5, RC5-RC7, RC7-RC9—3D contours of condyle RC4, RC6, RC8 and contours of TMJ fossa RF4, RF6, RF8 are created, respectively, 9 3D contours of condyle and 9 3D contours of TMJ fossa are obtained (FIG. 9A, B, C, D).

Figure 10:
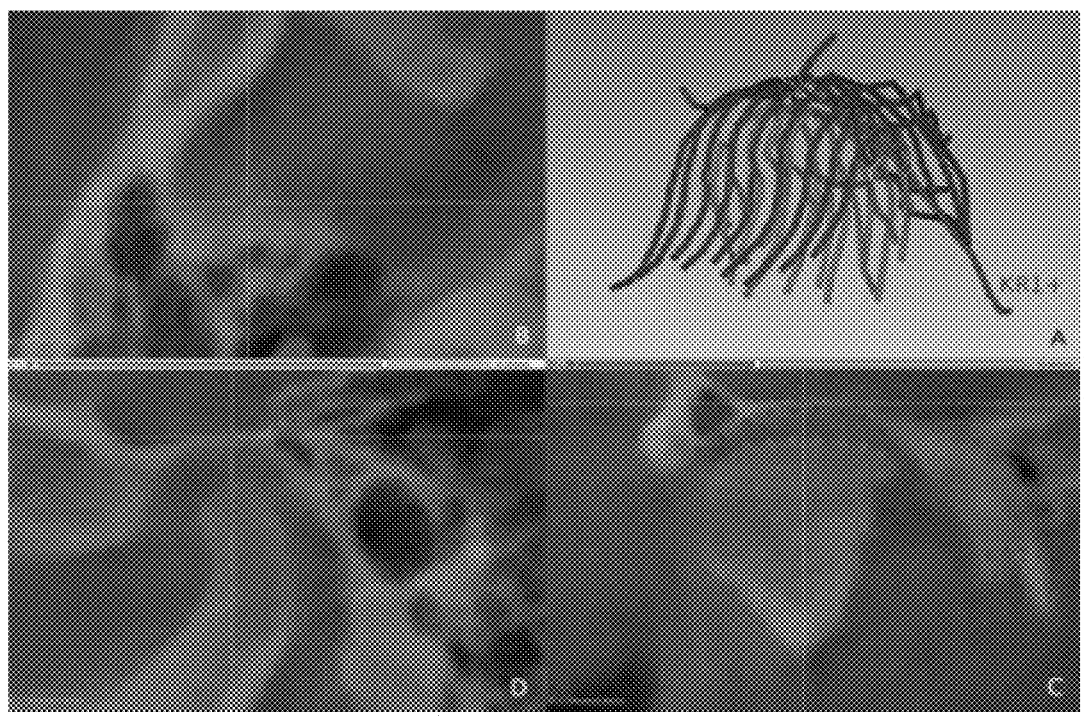
FIG. 10—top highest point of TMJ fossa is visualized and 3D contour of fossa KR1+ is created in frontal projection: A) 3D scene with obtained contour of TMJ fossa (KR1+); B) axial projection of top highest point of TMJ fossa; C) frontal projection of obtained contour KR1+; D) sagittal projection of top highest point of TMJ fossa.

In a multiplanar reconstruction of CT assessment, the top point of TMJ fossa is visualized and 3D contour KR1+ of TMJ fossa is created in frontal projection (FIG. 10 A, B, C, D).

In a MPR of CT assessment, from the obtained contour KR1+, shifting 3 mm to the front, the 3D contour of TMJ fossa KR2+ is created in frontal projection (FIG. 11A, B, C, D).

Figure 12:
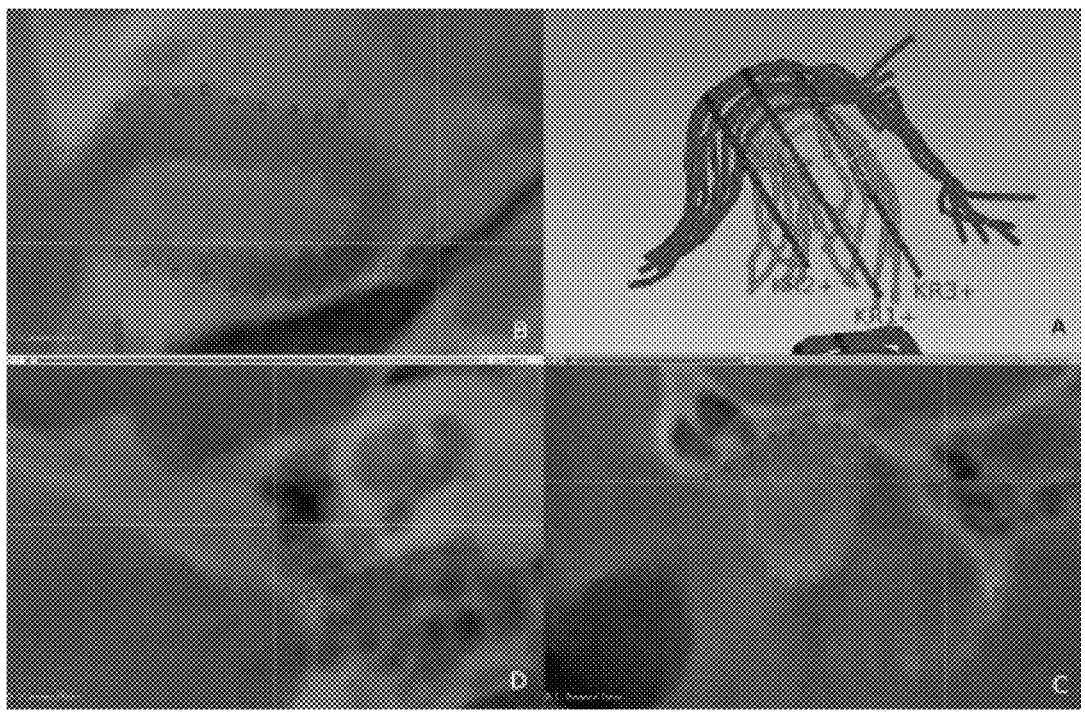
FIG. 12—creation of 3D contour of TMJ fossa KR3+: A) 3D scene of obtained contours of TMJ fossa's KR1+, KR2+, KR3+; B) axial projection; C) frontal projection, created contour KR3+; D) sagittal projection.

In a multi-planar reconstruction from the obtained contour KR1+, shifting 3 mm distally, the 3D contour of TMJ fossa KR3+ is created in frontal projection (FIG. 12 A, B, C, D).

For left TMJ, the sequence described above is repeated to obtain a 3D contour model of left TMJ with respected 3D models of contours and their designations LC (1-9), LF (1-9) and KL (1+, 2+, 3+).

Figure 13:
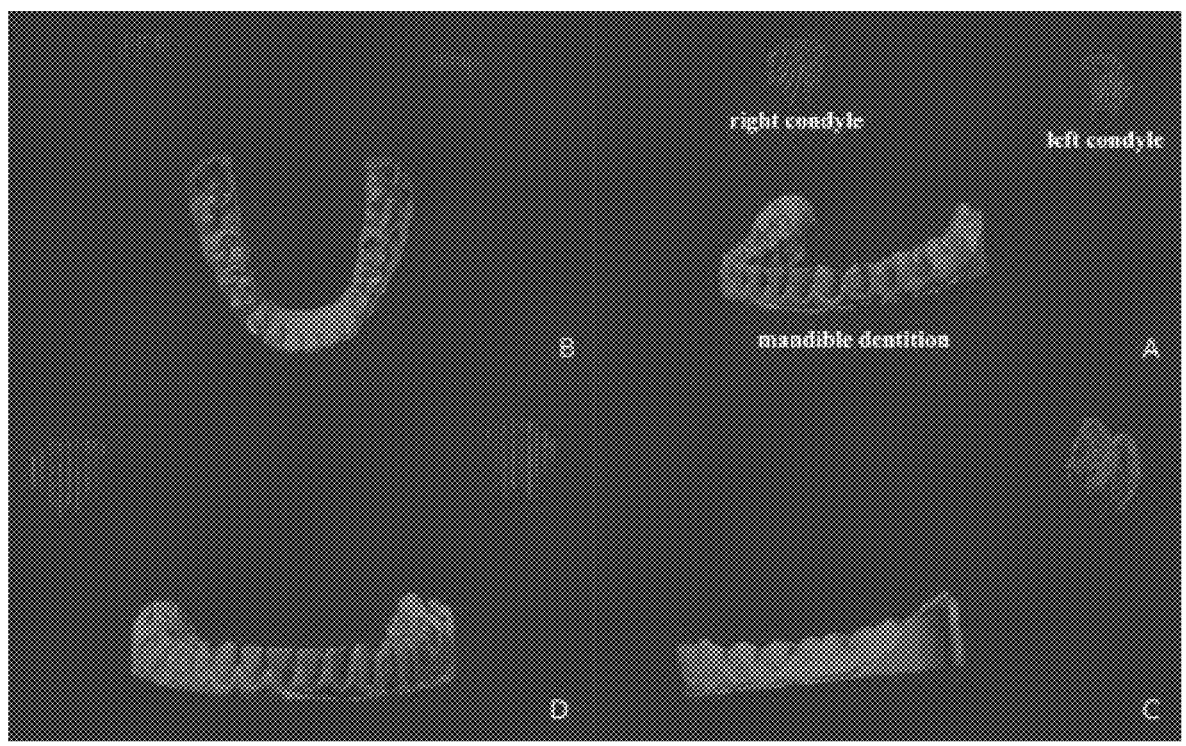
FIG. 13—full 3D model of mandible with dental arch and 3D contours of condyles: A) 3D scene of combined models, dental arches of mandible and condyles; B) top view: C) left view; D) frontal view.

3D objects of contours of right and left condyles RC(1-9), LC(1-9) are combined with 3D model of mandible with dental arch, which was previously integrated into multi-planar reconstruction of CT and complete 3D model of mandible with dental arch and condyles is obtained (FIG. 13 A, B, C, D).

Figure 14:
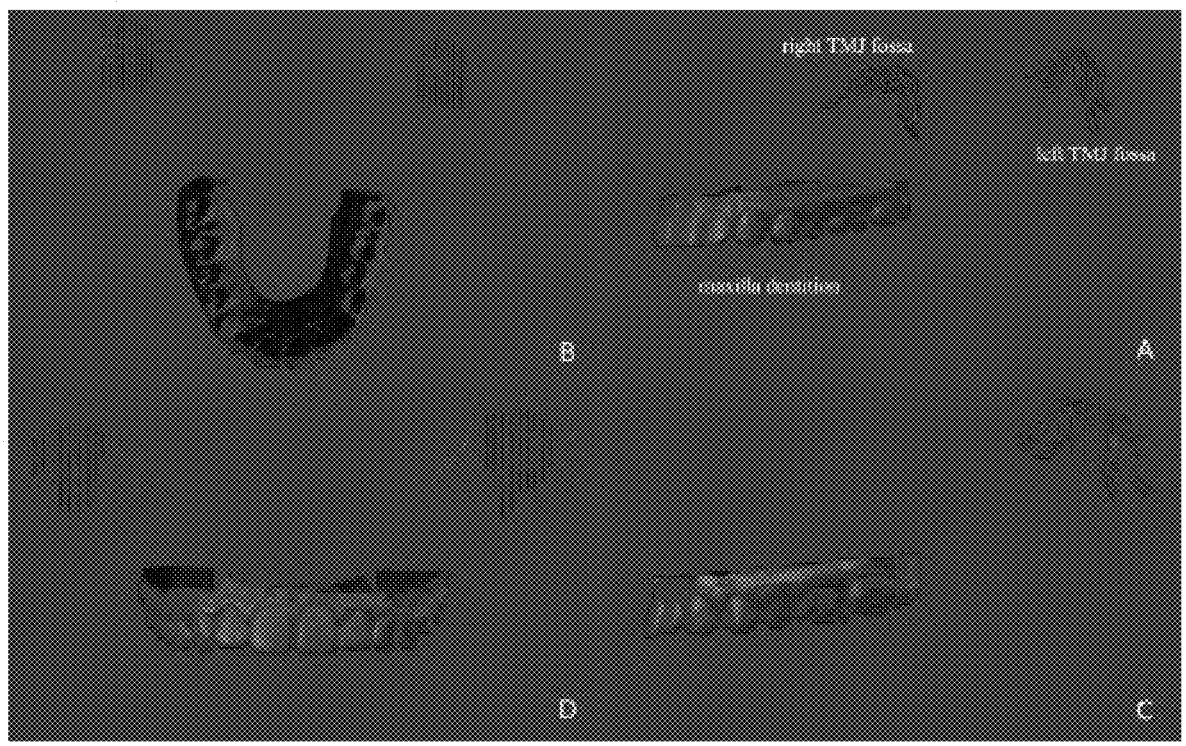
FIG. 14—complete 3D model of maxilla with dental arch and contours of TMJ fossa's (immovable part of the skull): A) 3D scene with combined models, dental arch of maxilla and contours of TMJ fossa's; B) top view; C) left view; D) frontal view.

3D objects of contours of right and left TMJ fossa's RF(1-9), LF(1-9) and contours KR(1+, 2+,3+), KL(1+,2+, 3+) are combined with 3D model of dental arch of upper jaw, which was previously integrated into multi-planar reconstruction of CT and complete 3D model of upper jaw with dental arch and contours of TMJ fossa's are obtained (immovable part of the skull) (FIG. 14 A, B, C, D).

As a result, a 3D scene is obtained, with precise models of dental arches, condyles and TMJ fossas.

Obtained contour 3D models of TMJ bear the following characteristics:

3D models of each condyle are represented by 9 contours obtained in sagittal projection of CT assessment. Positions of points of contours in CT are determined by dividing the distance from outer margin to inner margin to 8 equal parts for each condyle.

3D models of each TMJ fossa are represented by 9 contours, obtained in sagittal projection and by 3 additional contours obtained in frontal projection of CT assessment. Position of points of contours of fossa's in sagittal projection are related to points determined for contours of condyles. Positions of points of contours of fossa's in frontal projection are described in manual (FIG. 10, 11, 12).

Thickness of each contour while positioning into multi-planar reconstruction equals 0.1 mm. Thickness of the 3D model of each obtained contour is 0.1 in diameter.

Figure 16:
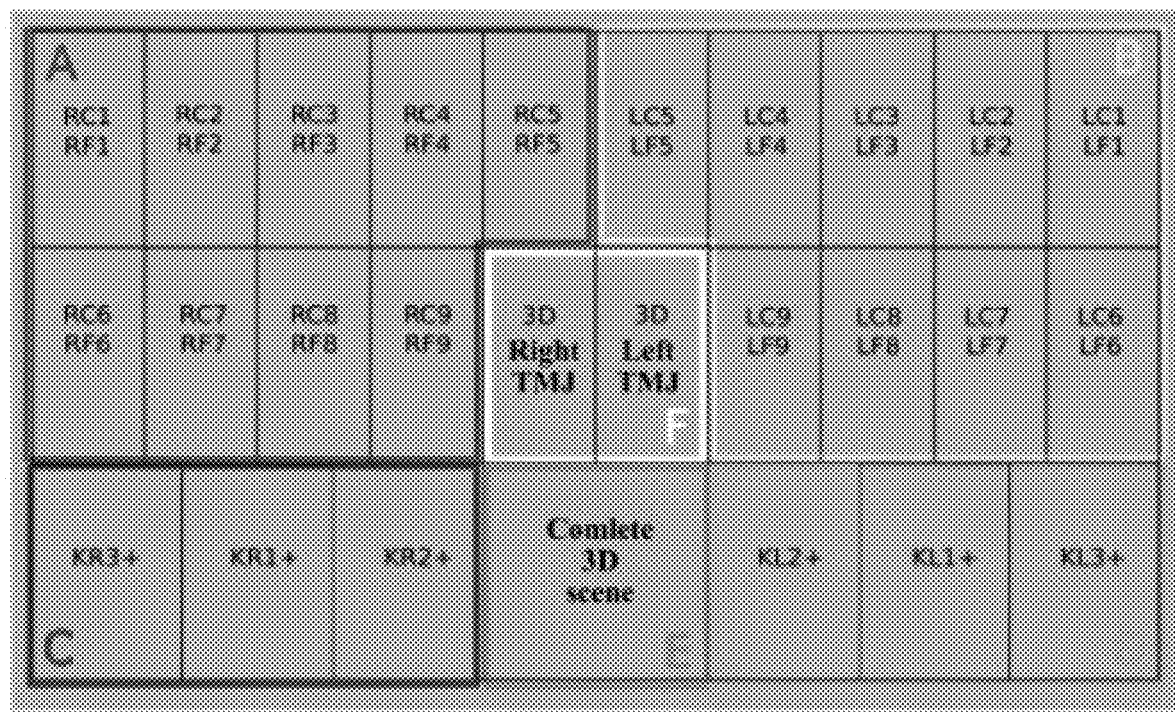
Figure 17:
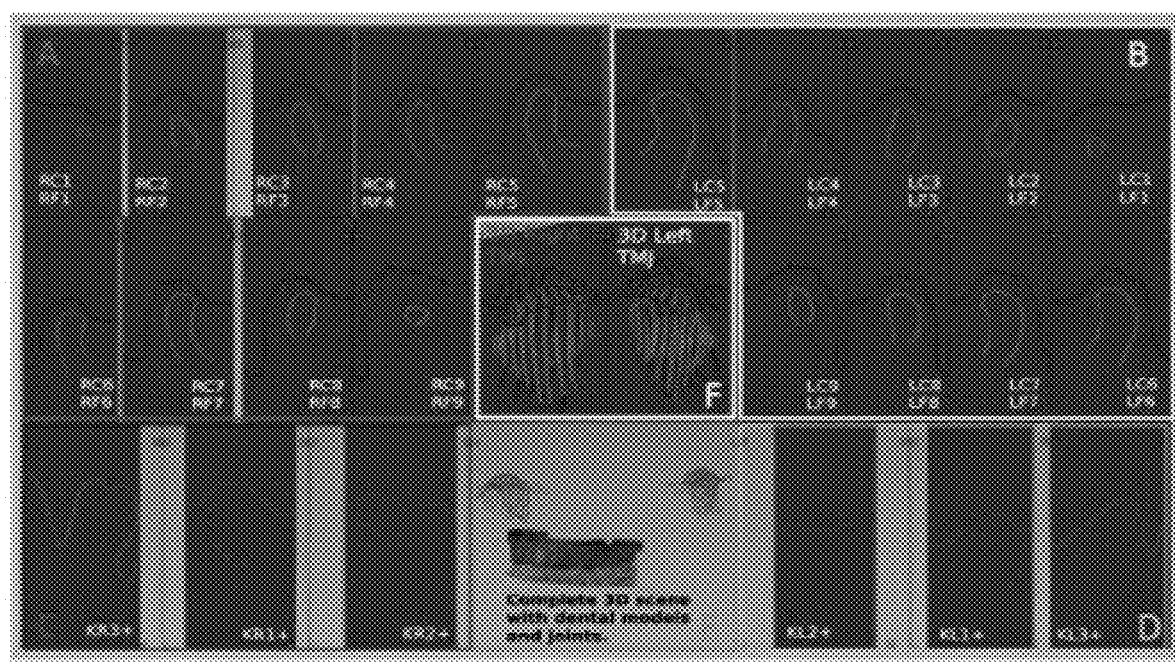

Next, obtained objects of 3D scene are allocated into 6 zones in the window interface with help of commonly known 3D editors (ex. 3D Max https://www.autodes.ru/products/3dsmax/overview) (FIG. 16 A,B,C,D,E,F). Amount of cells equals the amount of obtained contours in sagittal projection for right and left joints respectively. (FIG. 16 A,B). Complete display of the 3D scene with models of jaws and joints is in zone E (FIG. 16 E). Objects of contours obtained in frontal projection with respected designations KR+, KL+ are located in zones C and D, with respect to the sides and designations. 3D models of right and left TMJ are displayed in zone F (FIG. 16 F). Complete display of objects is viewed on FIG. 17 A,B,C,D,E,F.

The method is illustrated by a clinical example.

Patient XXX, 18 y.o. female. Chief complaint is constant dull ache in TMJ region. Pain is intensified while eating, especially firm foods. Also, intensification of pain is noted after night sleep. Click is also noted in the right TMJ.

According to the patient, pain first appeared 8 months ago, especially after night sleep, then, after 2 months pain intensified after eating and periodic clicking in the right TMJ was noted. After about a month, clicking became constant. During the next 5 months the patient was dealing with pain while eating and tried to disregard the joint click. Patient describes pain as moderate and above. Patient also planned orthodontic treatment, when the orthodontist suggested the referral of the patient to TMJ specialists.

Clinical assessment along with complete medical history was conducted and additional diagnostic studies including MRT of the joint and CBCT of the head were also performed the diagnosis of TMJ dysfunction was concluded.

Figure 18:
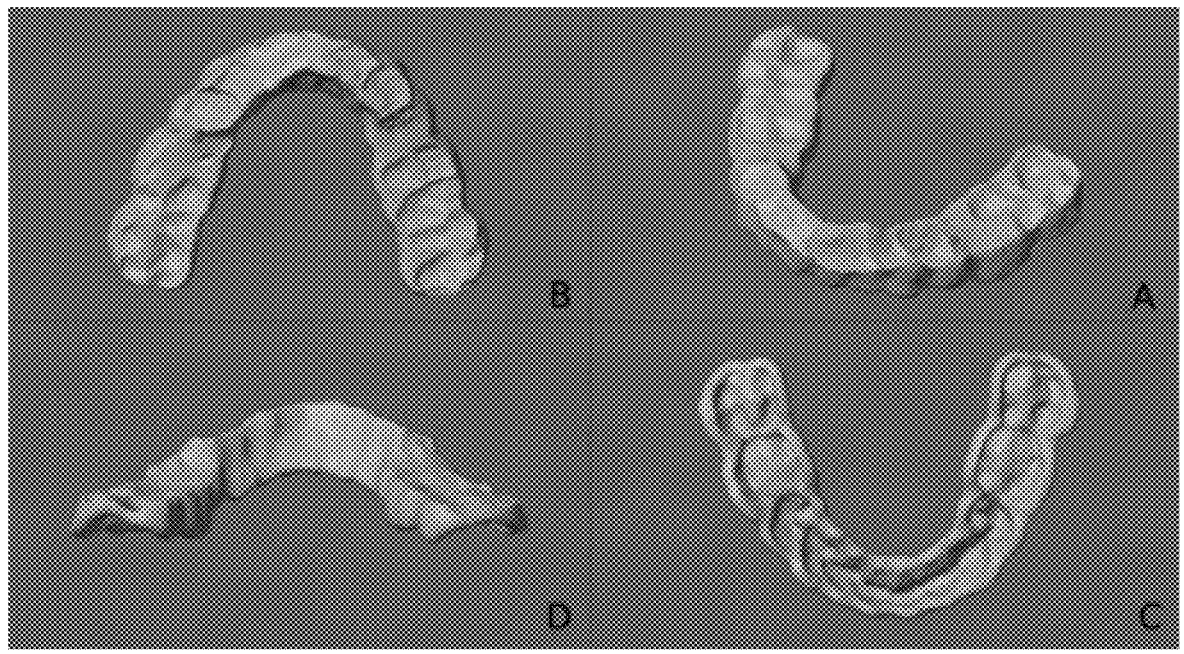
FIG. 18—lower jaw splint. A) overview; B) front view; C) right view; D) rear view FIG. 19—splint on models, demonstration of closure of jaws in treatment position: A) overview; B) front view; C) right view; D) rear view FIG. 20—the position of condyle in articular fossa in patients without abnormalities, striving point of treating the TMJ dysfunctions: A) CT slice in norm: 1—condyle; 2—protuberance, articular fossa; 3—disk; 4—external auditory meatus; B) schematic mapping of the same slice and values of joint space in frontal, top and rear regions in norm: 1—front section of joint space; 2—top section of joint space; 3—rear region of joint space.
Figure 19:
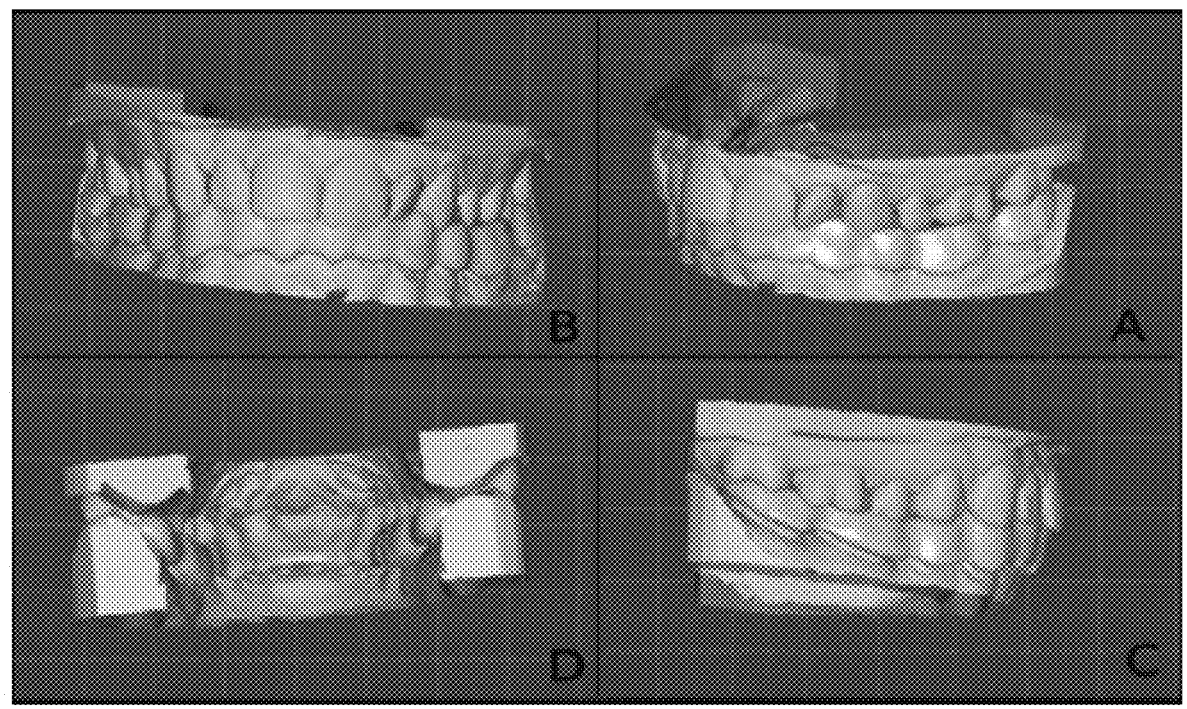
Figure 20:
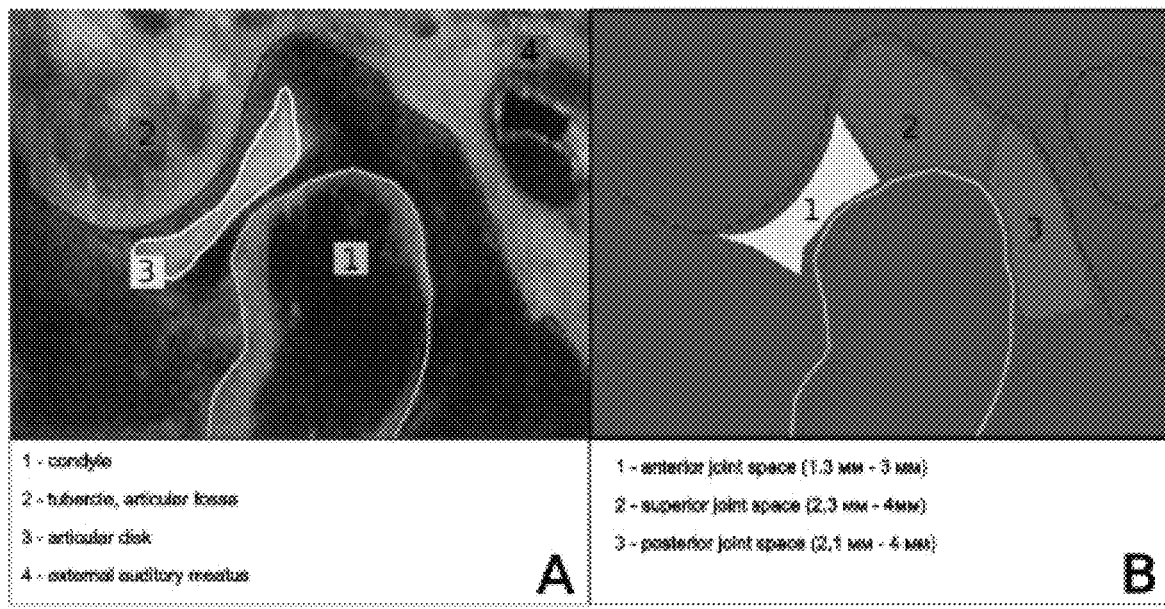

One of the methods and stages of treatment of TMJ dysfunction is manufacturing of the therapeutic splint (FIG. 18 A,B,C,D). Splint must be fabricated in the treatment position of the lower jaw (TPL). According to worldwide studies, this treatment position is characterized by the following measures of values of distances in joint space of TMJ: anterior region 1.3 mm-3 mm, superior region 2.3 mm-4 mm, posterior region 2.1 mm-4 mm (FIG. 20 A,B). In determining treatment position of the lower jaw it is imperative to achieve maximum precision while shifting mandible in space, giving it a new position, which will relate to criteria of TPL.

Figure 1:
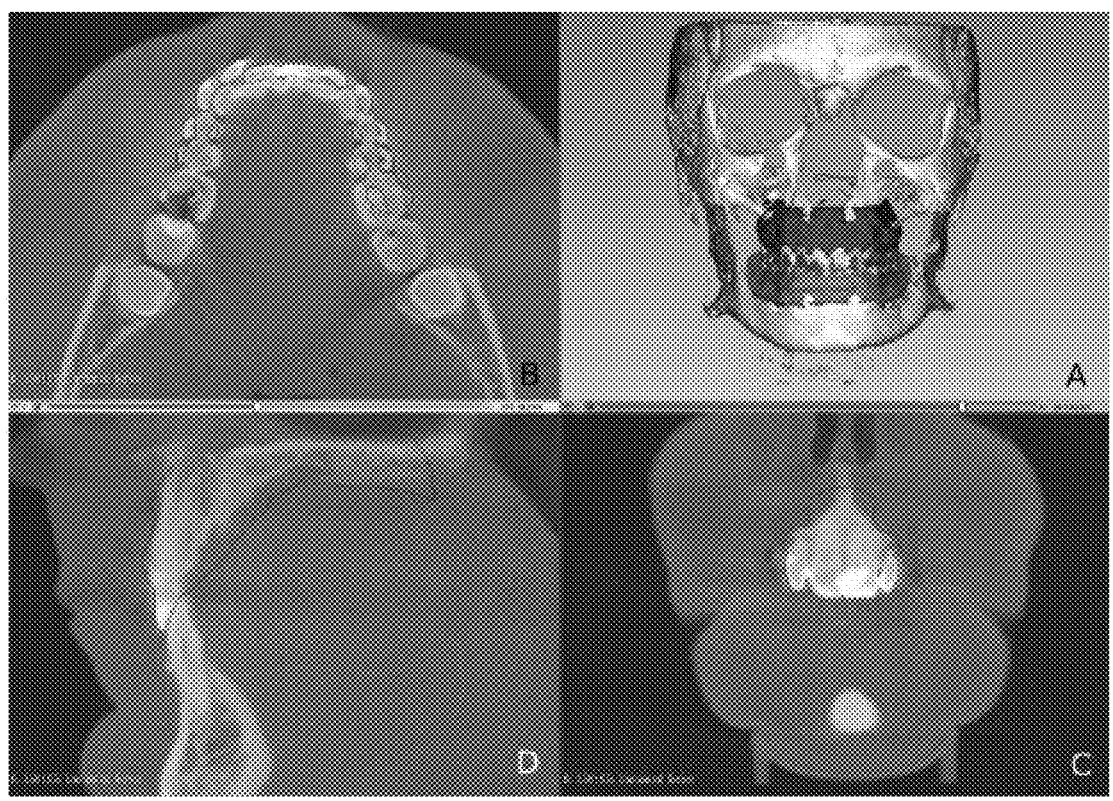
Figure 21:
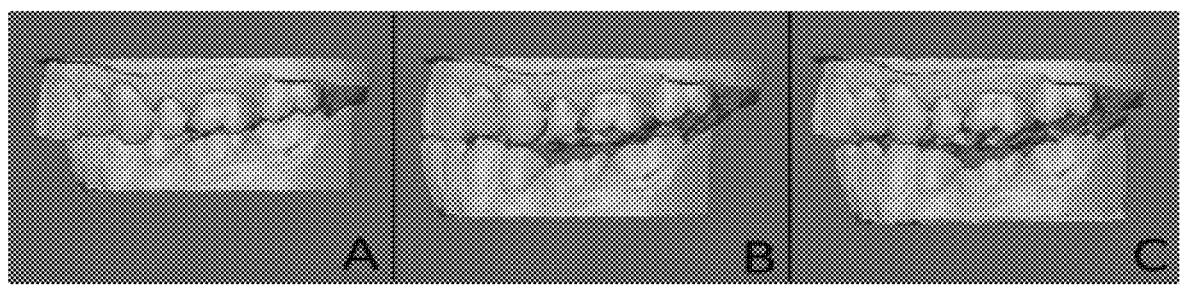
Figure 22:
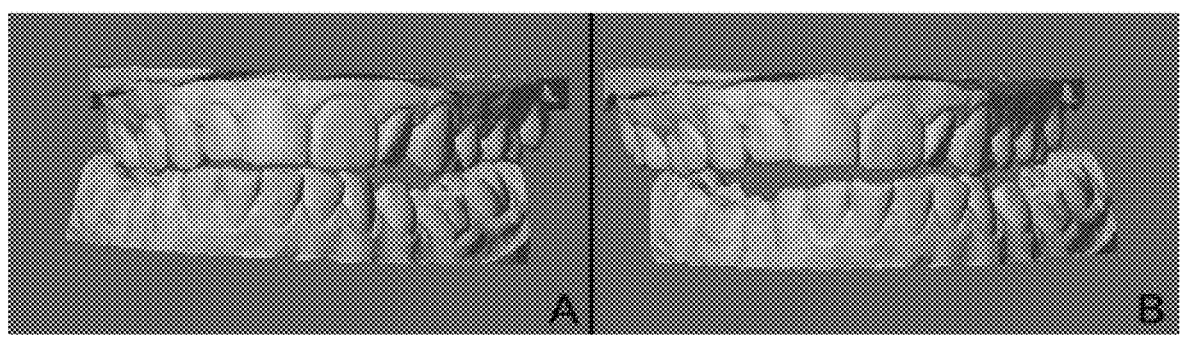

Universally accepted diagnostic steps were performed: obtained CT scan was aligned in 3D space based on Frankfurt's horizontal, dental arches of upper and lower jaws were scanned with an intra-oral 3D scanner. 3D models of upper and lower jaws were integrated into multi-planar reconstruction of CT (FIG. 1 A,B,C,D). The following 3D models were obtained: existing occlusion (CO), shift forward-protrusion (PRO), mouth open position (OP), shift right position-right laterotrusion (RL), shift left position-left laterotrusion (LL), (FIG. 21 A,B,C), (FIG. 22 A,B).

In software to view the CT assessments (Radiant Dicom Viewer https://radiantviewer.com) the right and left TMJ zones were consequentially visualized in sagittal, coronal and axial projections of a CT multiplanar reconstruction. Contours of condyle and fossa were created using a software tool, using the placing points method with its subsequent interpolation and creation of 3D contours. Objects were contoured.

Figure 3:
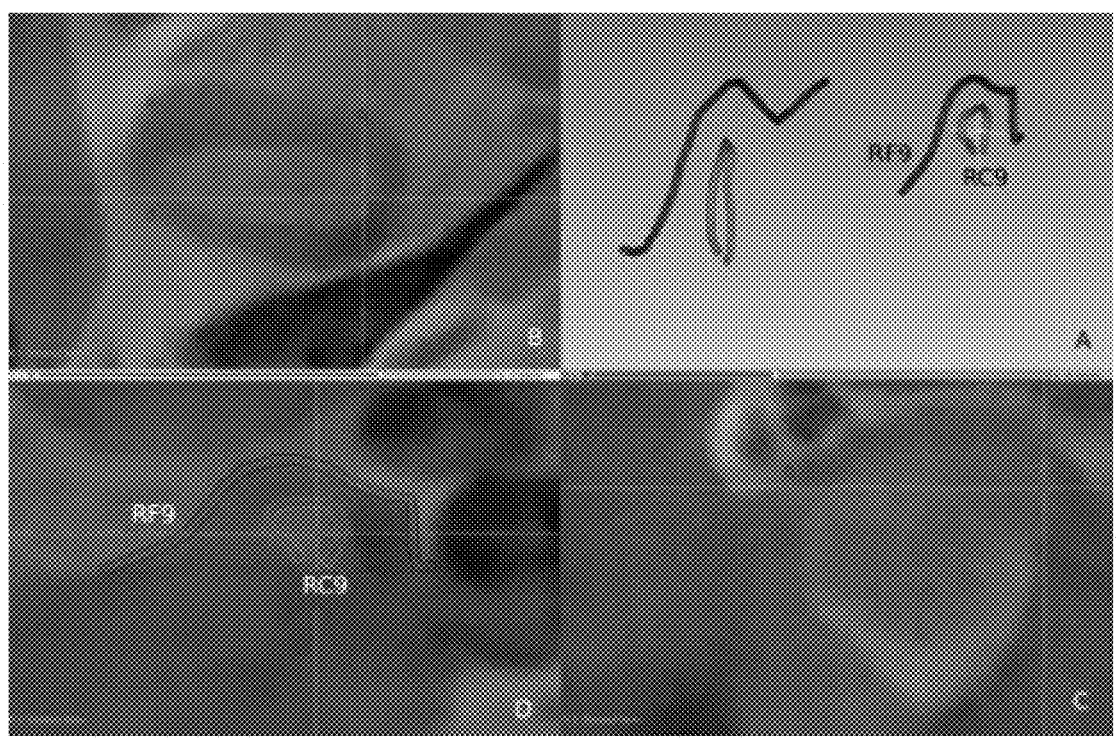

In a multiplanar reconstruction of a CT, the external margin of the right condyle was visualized and contours of condyle and fossa were marked in sagittal projection to obtain 3D contours of condyle RC1 and fossa RF1 (FIG. A,B,C,D). In multiplanar reconstruction of CT the inner margin of the right condyle was visualized and contours of condyle and fossa were marked in sagittal projection to obtain 3D contours of condyle RC9 and fossa RF9 (FIG. 3 A,B,C,D).

Figure 4:
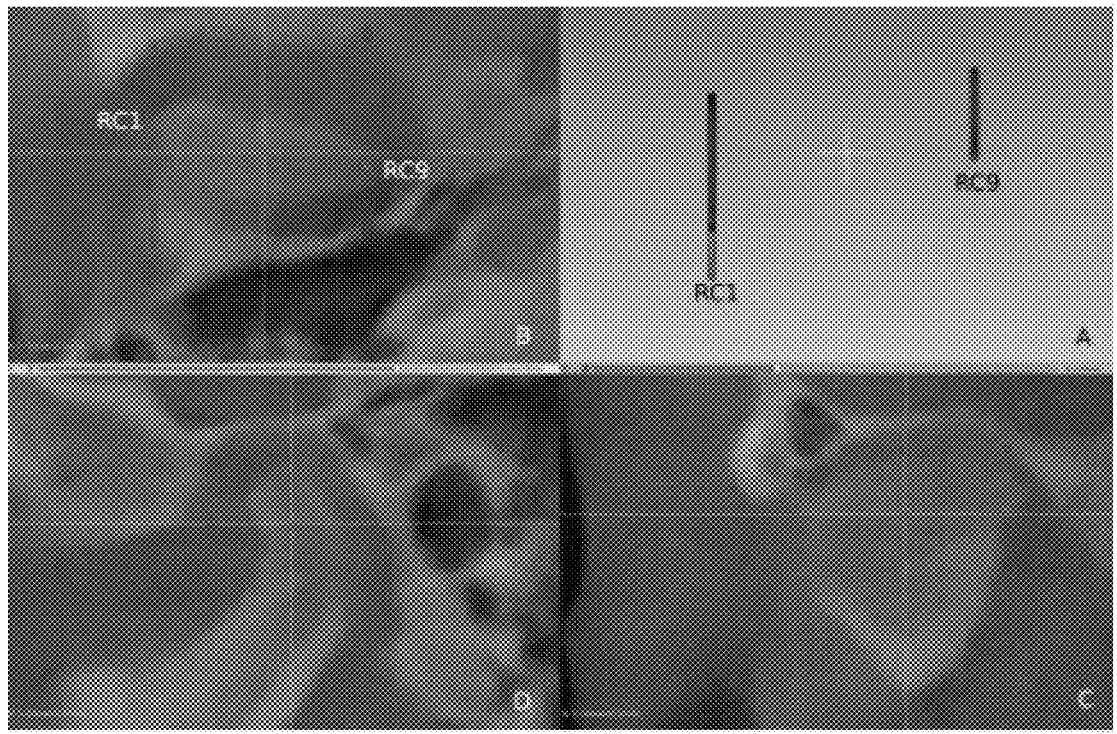
FIG. 4—condyle midpoint region: A) 3D scene on frontal projection. Cursor position-crosspoint, on the middle of the condyle; B) axial projection; C) frontal projection; D) sagittal projection.

With orientation to frontal projection, the distance between obtained contours of RC1 and RC9 was measured and divided in half to find the midpoint of the condyle and in that spectrum of assessment of CT, the middle of the condyle was visualized (FIG. 4 A, B, C, D).

Contours of condyle and fossa were marked in sagittal projection of visualized zone of the middle of condyle to obtain 3D contours of condyle RC5 and fossa RF5 (FIG. 5 A,B,C,D). Distance between obtained contours RC1-RC5 was measured, divided in half to find the position of a next slice of CT. Contours of condyle and fossa were marked in sagittal projection and 3D objects of contours of condyle RC3 and fossa RF3 were obtained (FIG. 6 A,B,C,D).

The distance between contours RC5-RC9 was measured and divided in half to find the position of the next slice of CT. Contours of condyle and fossa were marked in sagittal projection and 3D contours of condyle RC7 and fossa RF7 were created (FIG. 7 A,B,C,D).

Then, using the method described above, the middle of distances between obtained adjacent contours RC1-RC3 were found, to find the position of a next slice of CT, contours of condyle and fossa were marked in sagittal projection to obtain 3D objects of contour RC2 and RF 2 (FIG. 8 A,B,C,D).

Figure 9:
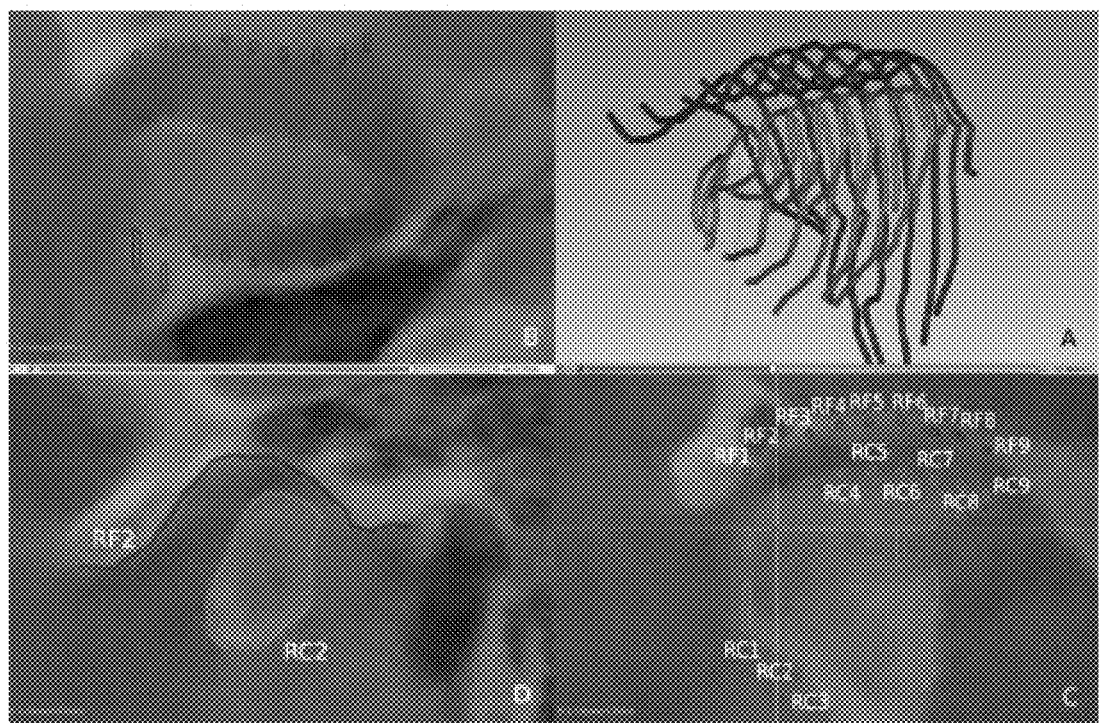
FIG. 9—nine obtained 3D contours of condyle and TMJ fossa, for the purpose of detailed visualization of TMJ volume: A) 3D scene with 9 obtained contours of condyle and TMJ fossa; B) axial projection; C) frontal projection, contours designations are marked; D) sagittal projection, the slice on the level of contours RC2, RF2.

Thereby, by finding the middle of distances between adjacent contours, 9 3D contours of condyle and 9 3D contours of TMJ fossa were created (FIG. 9 A,B,C,D).

Figure 11:
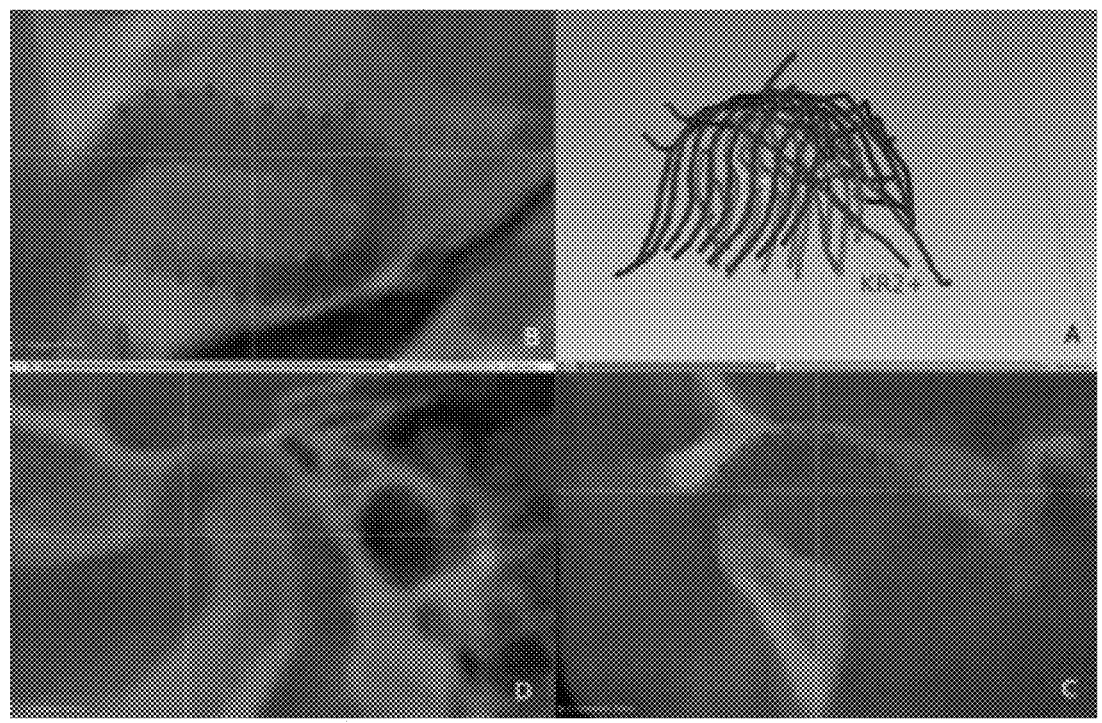
FIG. 11—creation of 3D contour of TMJ fossa KR2+: A) 3D scene with obtained contour of TMJ fossa KR2+; B) axial projection; C) frontal projection with obtained contour KR2+; D) sagittal projection.

In the multi-planar reconstruction of CT, the most top point of TMJ fossa was visualized and by marking the contour of fossa in frontal projection, 3D contour KR1+ was created (FIG. 10 A,B,C,D). In a multi-planar reconstruction of CT, shifting 3 mm to the front from the obtained contour KR1+ and marking the contour of fossa in frontal projection, 3D contour KR2+ was created (FIG. 11 A,B,C,D). In a multi-planar reconstruction of CT, shifting 3 mm distally from obtained contour KR1+ and marking the contour of fossa in frontal projection, 3D contour KR3+ was created (FIG. 12 A,B,C,D).

For left TMJ all actions described above were repeated like for the right TMJ, and a 3D contour model of left TMJ was obtained.

3D objects, contours of right and left condyles RC(1-9), LC(1-9) were combined with 3D models of mandible dental arch which was previously integrated into multi-planar reconstruction of CT and complete 3D model of lower jaw with dental arch and 3D contours of condyle was obtained (FIG. 13 A,B,C,D).

3D objects, contours of right and left fossa RF(1-9), LF(1-9) and KR(1+,2+,3+), KL(1+,2+,3+) were combined with 3D models of dental arch of upper jaw, which was previously integrated into multi-planar reconstruction of CT and the model of immovable part of the skull was obtained (FIG. 14 A,B,C,D).

Figure 15:
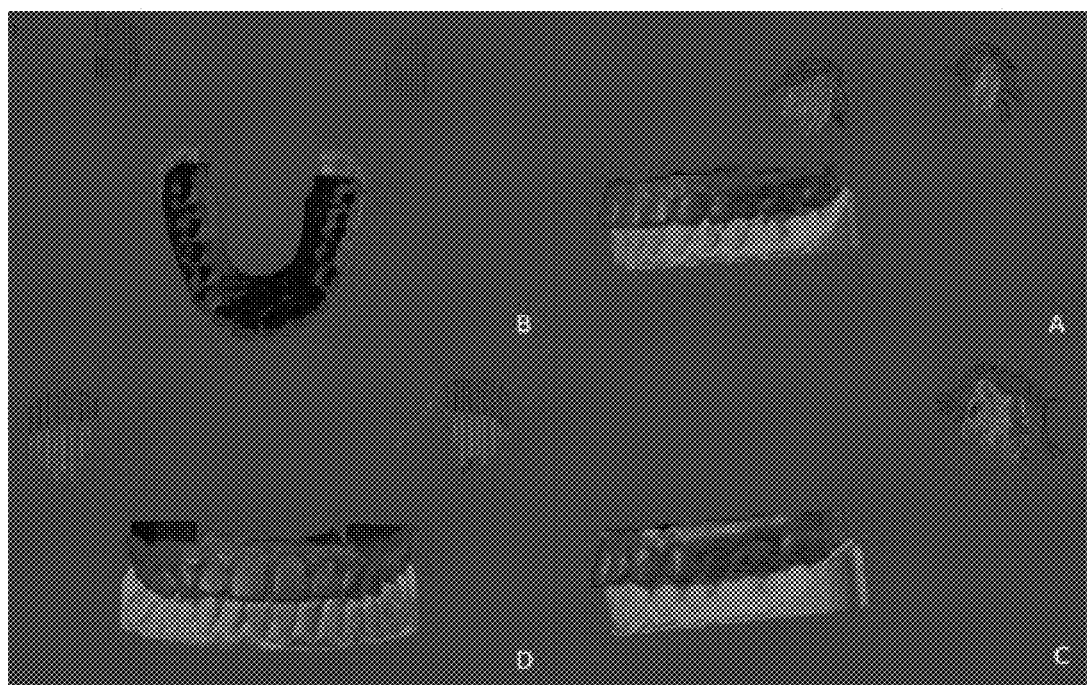

3D scene of precise models of dental arches, condyles and TMJ fossas were obtained as a result (FIG. 15 A,B,C,D).

Further, obtained objects of the 3D scene were allocated into 6 zones in the window interface with the help of common 3D editor 3D Max (https://autodesk.ru/products/3ds-max/overview) (FIG. 16 A,B,C,D,E,F).

Amount of cells equals the amount of obtained contours in sagittal projection for right and left joints respectively (FIG. 16 A,B) Full view of complete 3D scene with models of jaws and joints is displayed in zone E (FIG. 16 E). Objects of contours, obtained in frontal projection (KR+, KL+) are located in zones C and D (FIG. 16 C,D) with respect to the sides and designations. 3D models of right and left TMJ are displayed in zone F (FIG. 16 F). Complete allocation of objects is displayed in FIG. 17 A,B,C,D,E,F.

As a result, highly precise 3D models of TMJ were created. Thickness of contours of condyle and fossa, which form 3D models of TMJ, is under 100 microns, which conforms to the precision values in CT assessments (Table 1).

Figure 23:
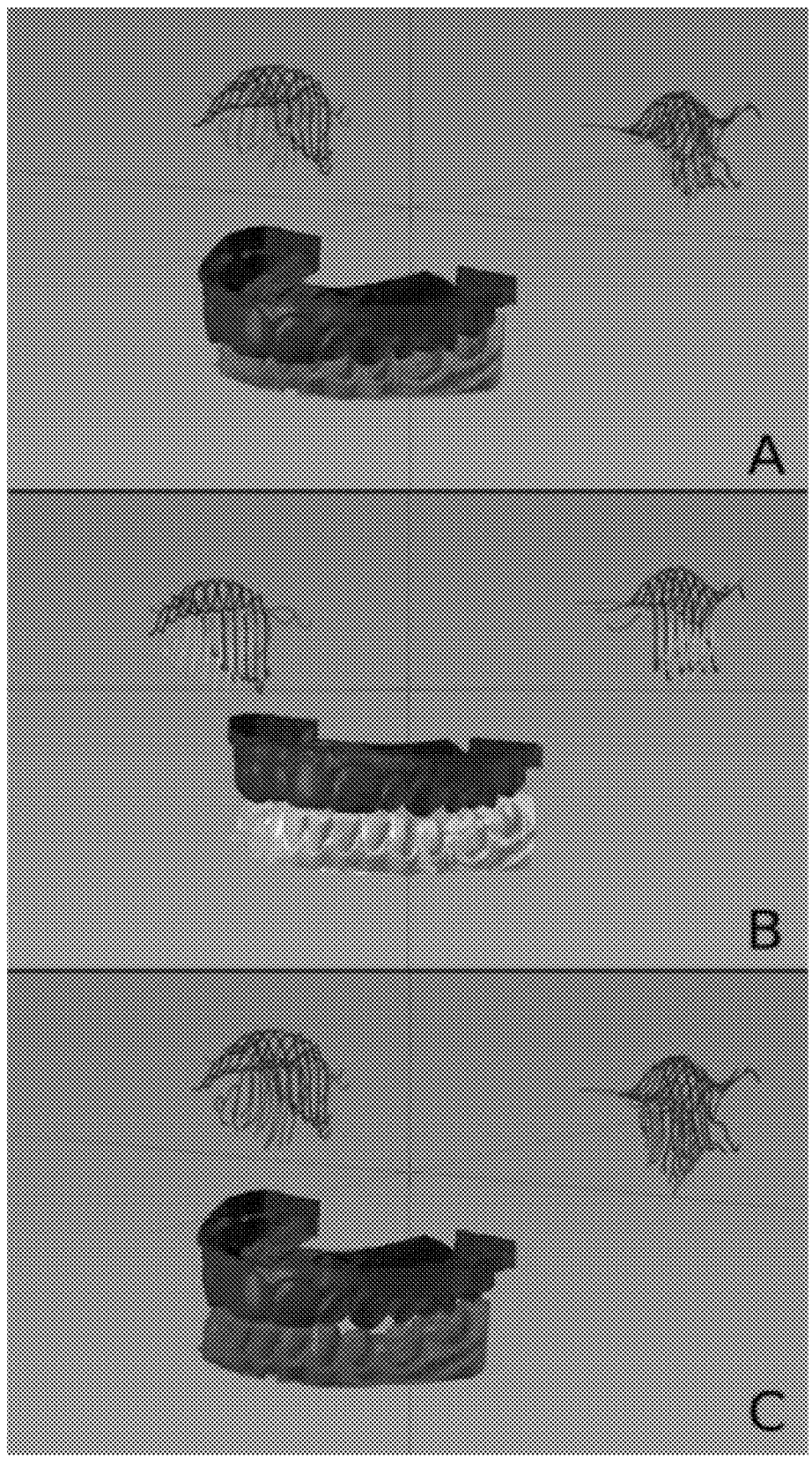
Figure 24:
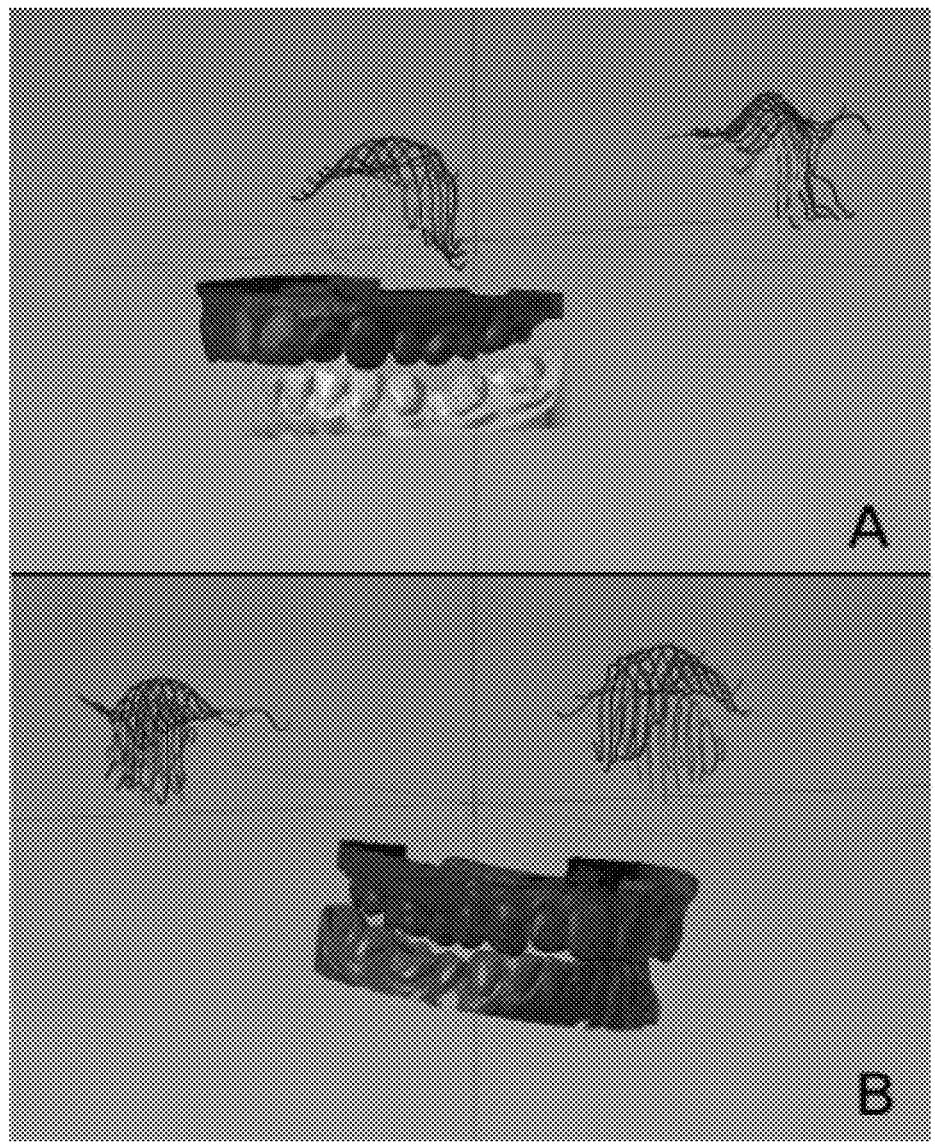
Figure 25:
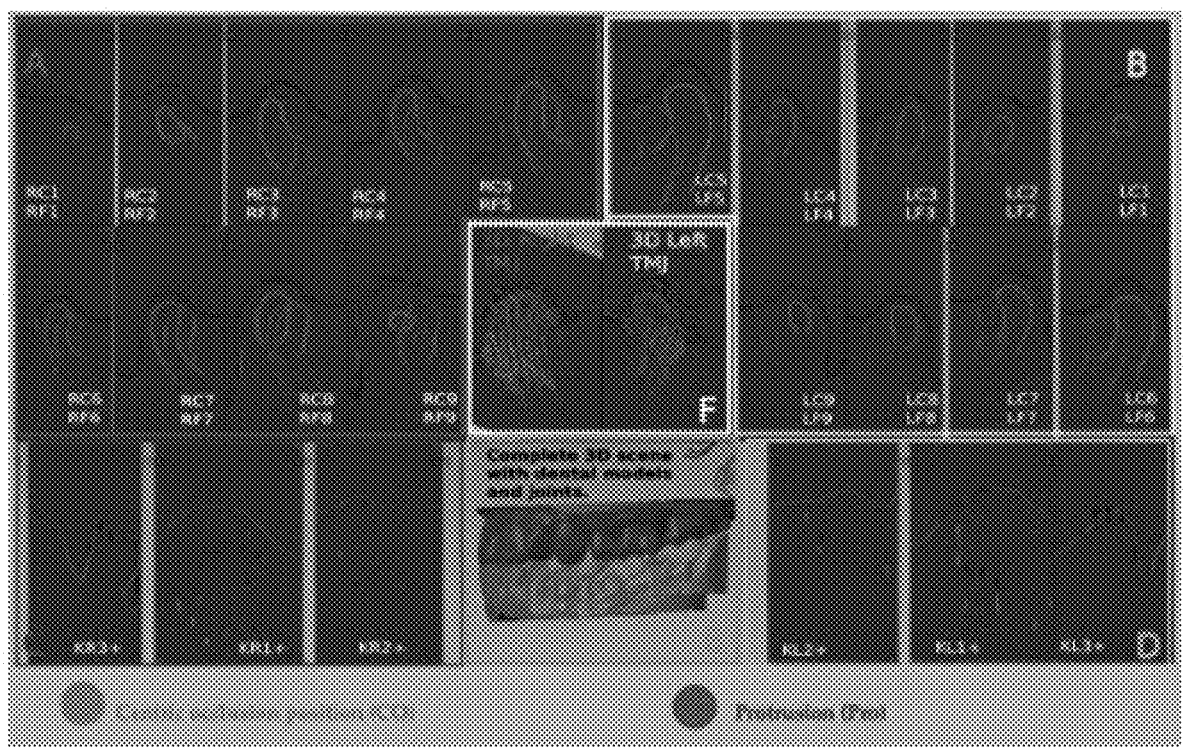
Figure 26:
FIG. 26—demonstration of 3D objects allocated in window interface; position of habitual occlusion and position of open mouth (OP): A) mapping zone of contours of right TMJ obtained in sagittal projection; B) mapping zone of contours of left TMJ obtained in sagittal projection; C) mapping zone of contours of right TMJ obtained in frontal projection; D) mapping zone of contours of left TMJ obtained in frontal projection; E) mapping zone of combined 3D scene with models of jaws and models of joints; F) mapping zone only for 3D models of TMJ, right and left respectively.
Figure 27:
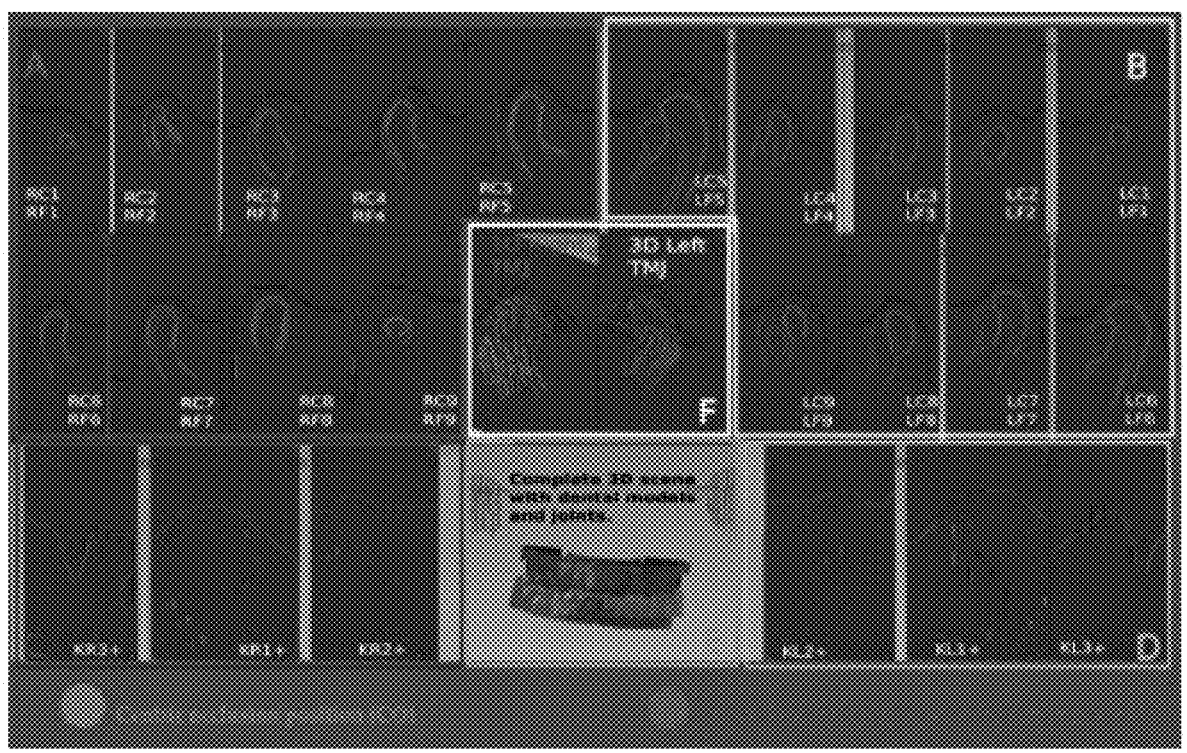
FIG. 27—demonstration of 3D objects allocated in window interface; position of habitual occlusion and position with right shift—right laterotrusion (RL): A) mapping zone of contours of right TMJ obtained in sagittal projection; B) mapping zone of contours of left TMJ obtained in sagittal projection; C) mapping zone of contours of right TMJ, obtained in frontal projection; D) mapping zone of contours of left TMJ obtained in frontal projection; E) mapping zone of combined 3D scene with models of jaws and models of joints; F) mapping zone only for 3D models of TMJ, right and left respectively.
Figure 28:
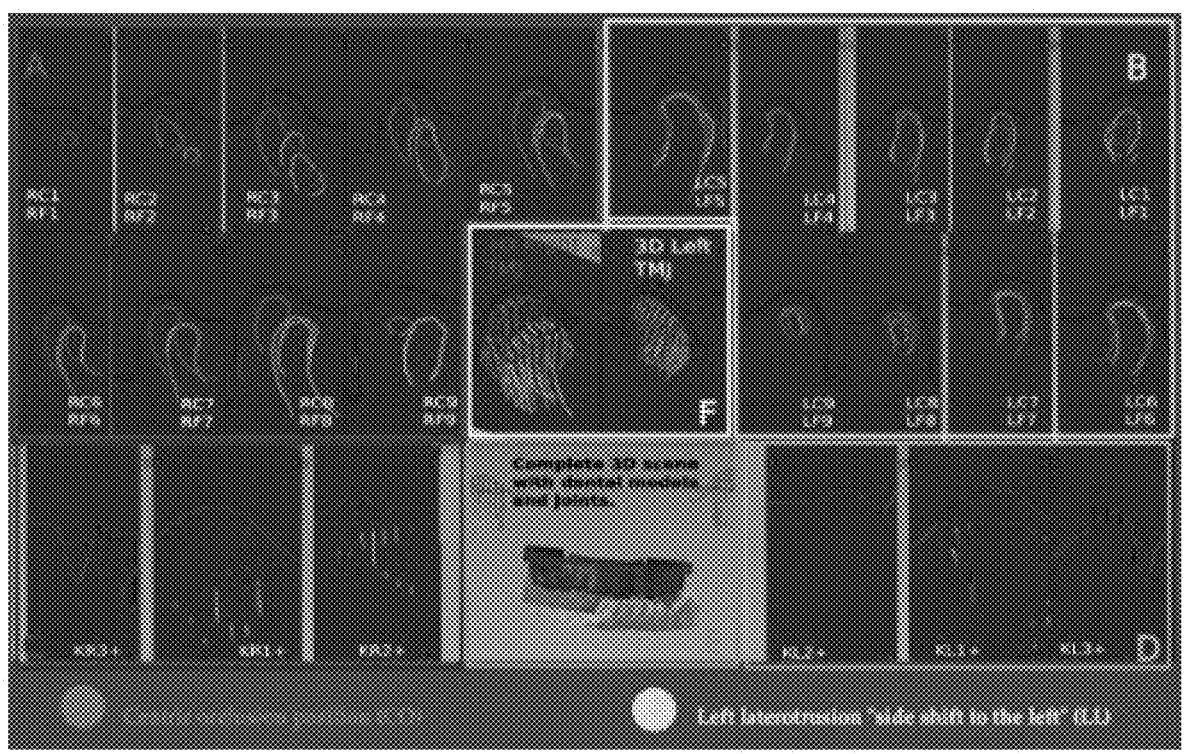
FIG. 28—demonstration of 3D objects allocated in window interface; position of habitual occlusion and position with left shift—left laterotrusion (LL): A) mapping zone of contours of left TMJ obtained in frontal projection; B) mapping zone of contours of left TMJ obtained in frontal projection; C) mapping zone of contours of left TMJ, obtained in frontal projection; D) mapping zone of contours of left TMJ obtained in frontal projection; E) mapping zone of combined 3D scene with models of jaws and models of joints; F) mapping zone only for 3D models of TMJ, right and left respectively.

Next, obtained contour models of TMJ were combined with models of jaws in CO, PRO, RL, LL and OP positions to obtain positions of condyles in TMJ fossa's in accordance to motions of lower jaw (FIG. 23 A,B,C), (FIG. 24 A,B). All obtained objects of the 3D scene were allocated into 6 zones in the window interface with help of the 3d editor 3D max https://www.autodesk.ru/products/3ds-max/overview (FIG. 16. A,B,C,D,E,F). Complete display of 3D scene with models of jaws and joints with all registered positions was obtained. (FIG. 25,26,27,28)

Figure 29:
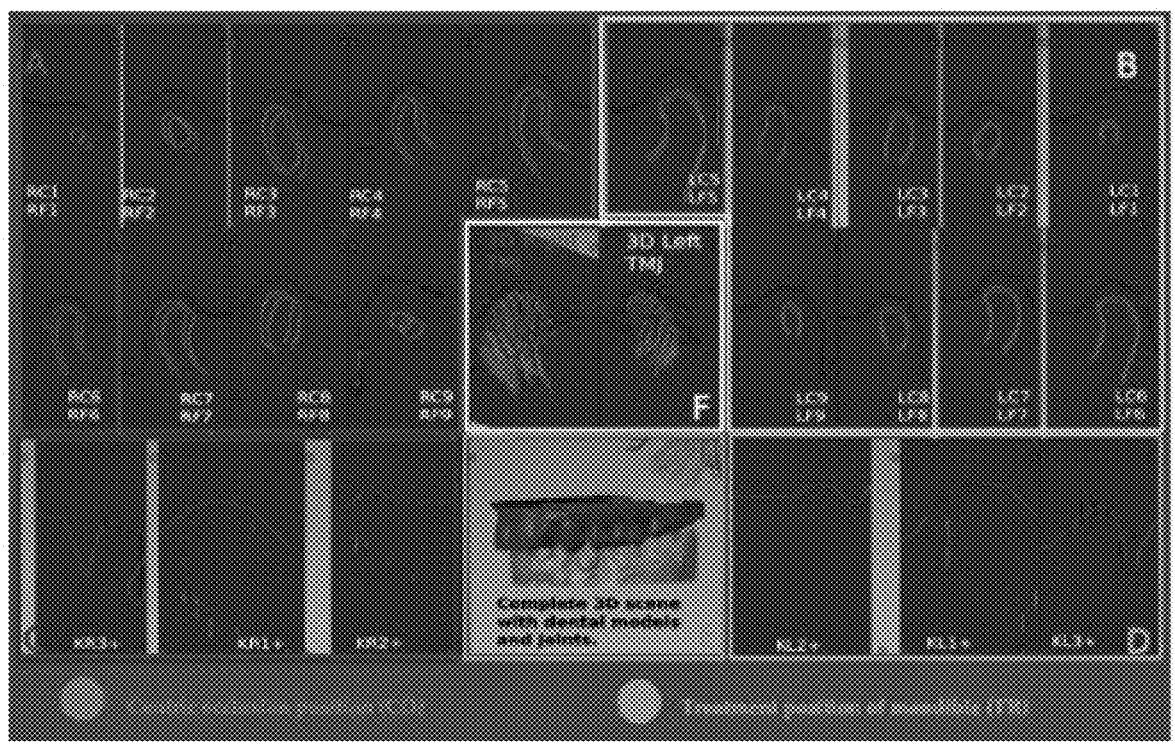
FIG. 29—demonstration of 3D objects allocated in window interface; position of habitual occlusion and treatment position of mandible (TR): A) mapping zone of contours of right TMJ obtained in sagittal projection; B) mapping zone of contours of left TMJ obtained in sagittal projection; C) mapping zone of contours of right TMJ obtained in frontal projection; D) mapping zone of contours of left TMJ obtained in frontal projection; E) mapping zone of contours of combined 3D scene with models of jaws and models of joints; F) mapping zone only for 3D models of TMJ, right and left respectively.
Figure 30:
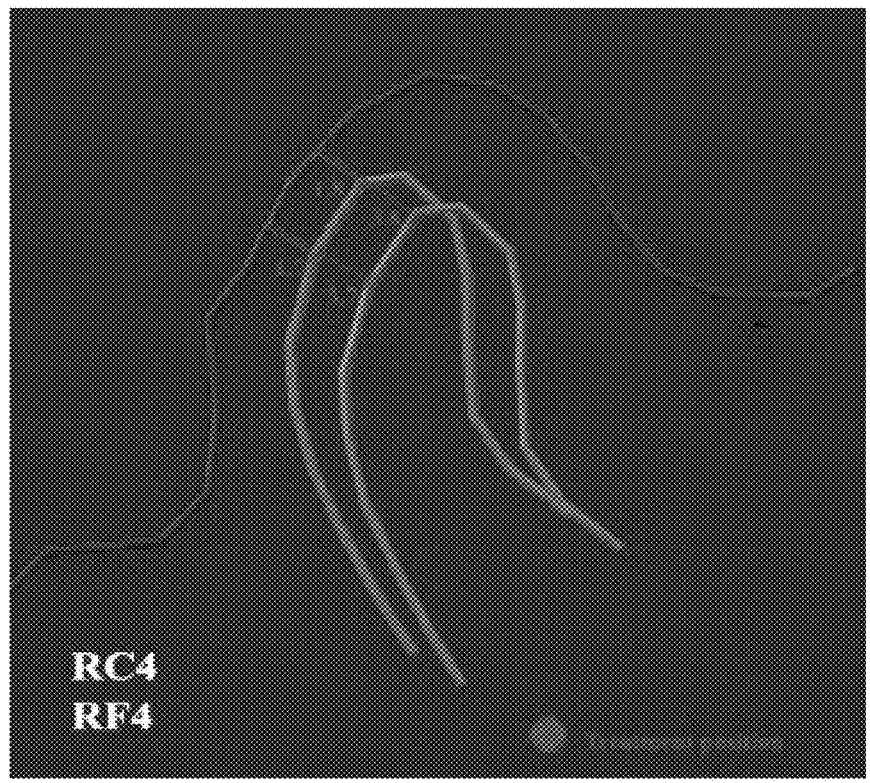

Then, the copy of the 3D object of lower jaw and 3D models of condyle was created, relative to CO position and transferred this copy in 3D space to position that meets the criteria of a treatment position (FIG. 29). Using the example of contours RC4-RF4 of the right TMJ model, produced movement of the condyle is visible. In the posterior region of joint space from 1.7 mm to 3.7 mm, in the superior region from 1.8 mm to 3.8 mm (FIG. 30).

3D models of jaws in treatment position were exported to Exocad—https//.exocad.com software to fabricate the splint by 3D print method (FIG. 18,19).

Figure 31:
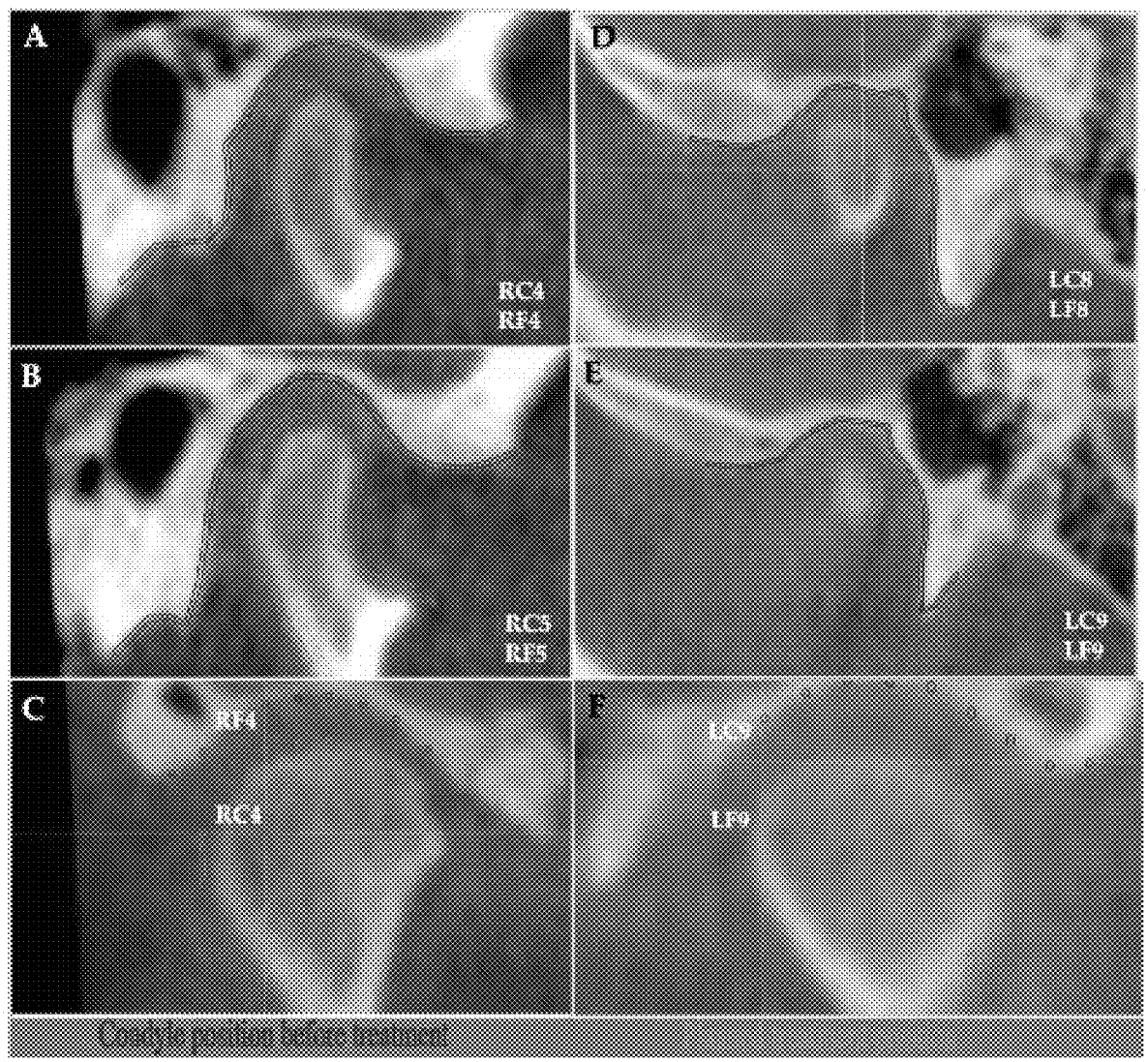
FIG. 31—superimposition of control CT with splint is conducted, with contours of 3D models of TMJ before treatment and contours of assigned treatment position, the possibility of precise positioning of mandible and analysis of margin of error is demonstrated: A) CT slice and contour of right TMJ RC4-RF4, sagittal projection; B) CT slice and contour of 3D model of right TMJ RC5-RF5, sagittal projection; C) CT slice and contour of 3D model of right TMJ, frontal projection cursor in the region of contour RC4-RF4; D)CT slice and contour of 3D model of left TMJ LC8-LF8, sagittal projection; E) CT slice and contour of 3D model of left TMJ LC9-LF9, sagittal projection; F) CT slice and contour of 3D model of left TMJ, frontal projection cursor in the region of contour LC9-LF9.
Figure 32:
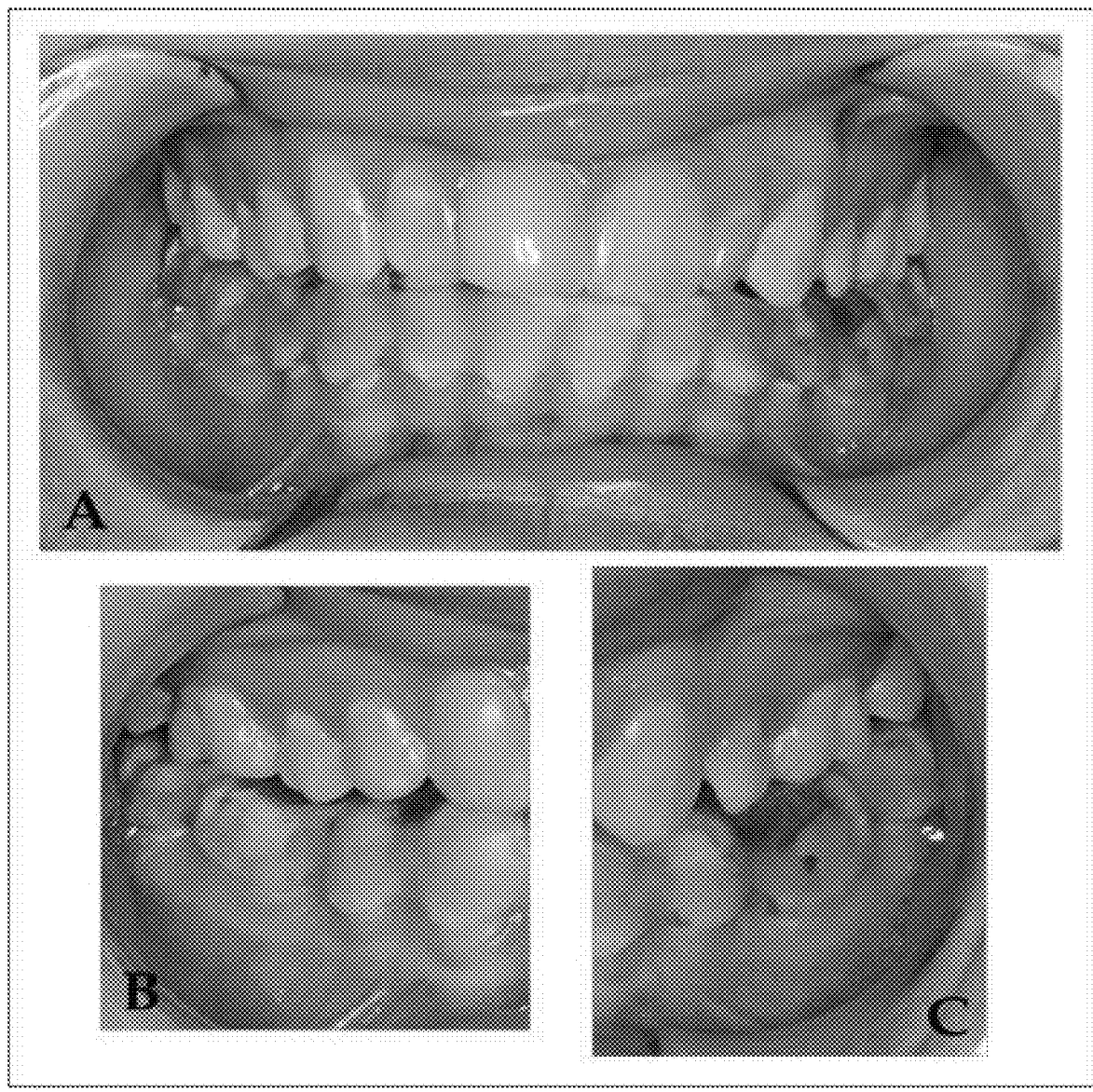
FIG. 32—splint in patients mouth: A) front view/overview; B) right view; C) left view, molar region.

Patient was wearing a splint for 1 week, after which another CT assessment was performed. Using voxel 3D superimposition method in 3DSlicer software—https://www.slicer.org CT before treatment was combined with CT in splint occlusion, 3D models of condyles with preassigned treatment position, and obtained position of condyles was compared with preassigned treatment position (FIG. 31 A,B,C,D,E,F)

After wearing a splint for 1 week, substantial improvement was noted by a patient. Constant dull ache was gone. Patient did not note pain during eating with the splint, where pain was coming back and intensified without the splint. Pain after night sleep was gone. Click sound on the right TMJ had disappeared.

Patient was referred back to the orthodontist for further treatment. The orthodontist conducted the treatment, using the achieved treatment position of lower jaw with splint fabricated with claimed method.

Considering technological margin of error in common methods, integration of 3D models into multi-planar reconstruction of CT assessment, voxel superimposition, manufacturing of splints, as well as individual clinical adaptation—this claimed method of constructing and displaying contour 3D models of TMJ structures, allows to conduct objective, precise 3D evaluation of morphology and position of condyles in TMJ fossas, to plan treatment position of lower jaw and repeatedly correct the position of lower jaw when needed in accordance to clinical tasks and dynamics in each patient individually.

All objects of 3D scene, contours of TMJ and models of jaws are allocated in a window interface, which allows visualization of all obtained objects in one window, divided into zones, and to analyze their morphology and shifts in space.

INDUSTRY APPLICABILITY

Using the method in clinical setting allows the following:
to create highly precise 3D models of condyles and TMJ fossa's with thickness of contours of 100 microns in diameter.
precisely position the mandible into treatment position and fabricate all kinds of restorations (crowns, inlays, onlays, fixed and removable prosthesis, splints, functional orthodontic appliances)
to avoid distortions, when 3D models of TMJ are obtained using commonly known methods of auto-segmentation.

The invention claimed is:

1. A computer-implemented method for analyzing and displaying temporomandibular joint (TMJ) function and generating precision three-dimensional models from computed tomography (CT) scan data, the method comprising:
    receiving volumetric CT scan data of a patient's craniofacial region including right and left TMJs;
    generating, via multiplanar reconstruction (MPR) in a computer, sagittal, coronal, and axial projections of each TMJ region;
    sequentially isolating contours of condyles and articular fossae in said projections, for each of the right and left TMJs, including for the right TMJ:
    (a) in a first sagittal slice, encircling an external margin of the condyle and the articular fossa to produce three-dimensional objects RC1 and RF1;
    (b) in a subsequent sagittal slice, encircling the internal margin of the condyle and fossa to produce three-dimensional objects RC9 and RF9;
    (c) measuring, in frontal projection, a distance between RC1 and RC9, dividing the distance in half, and identifying a condylar midpoint;
    (d) repeating contouring steps in sagittal projections at said midpoint to obtain intermediate contour objects RC5 and RF5, and subsequently repeating between RC1-RC5 and RC5-RC9 to obtain contour objects RC3/RF3 and RC7/RF7;
    (e) deriving additional contour objects RC2, RC4, RC6, RC8 and corresponding fossae RF2, RF4, RF6, RF8 by interpolating midpoints between adjacent contour slices;
    (f) generating nine condyle contours (RC1-RC9) and nine fossa contours (RF1-RF9) as three-dimensional objects, thereby constructing a precision three-dimensional model of the condyle and fossa;

(g) further isolating, in frontal projection, a superior contour of the fossa (KR1+), and generating additional fossa contours KR2+ and KR3+ by shifting approximately 3 mm anteriorly and posteriorly;

repeating steps (a) through (e) for the left TMJ to produce left-side contour sets LC1-LC9 and LF1-LF9 and superior fossa contours KL1+, KL2+, KL3+;

merging the right and left condyle models with a digital mandibular dental arch, and merging the right and left fossa models with a digital maxillary dental arch, thereby forming complete three-dimensional craniofacial assemblies; and presenting said three-dimensional models within a graphical user interface that allocates reconstructed contours into zones corresponding to slice positions, enabling visualization and measurement of condylar motion within fossae at a precision on an order of approximately 100 microns.

2. The method according to claim 1, further comprising the steps of:

positioning the three-dimensional models in a treatment position;

exporting the three-dimensional models in the treatment position to a splint fabrication software; and fabricating a splint based on the treatment position via a three-dimensional printer.

3. The method according to claim 1, wherein the graphical user interface displays the three-dimensional models in six allocated zones for tracking condylar motion relative to the fossae.

4. The method according to claim 1, further comprising the steps of calculating and reporting anterior joint space (AJS), superior joint space (SJS), and posterior joint space (PJS) based on the assembled models.

* * * * *